US011039307B2

(12) United States Patent
Nakarmi et al.

(10) Patent No.: US 11,039,307 B2
(45) Date of Patent: Jun. 15, 2021

(54) METHOD AND NETWORK NODE FOR PAGING IN A WIRELESS COMMUNICATION SYSTEM

(71) Applicant: Telefonaktiebolaget LM Ericsson (publ), Stockholm (SE)

(72) Inventors: Prajwol Kumar Nakarmi, Sollentuna (SE); Enrique Cobo Jimenez, Stockholm (SE); Mats Näslund, Bromma (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 107 days.

(21) Appl. No.: 16/464,408

(22) PCT Filed: Dec. 29, 2017

(86) PCT No.: PCT/EP2017/084788
§ 371 (c)(1),
(2) Date: May 28, 2019

(87) PCT Pub. No.: WO2018/127453
PCT Pub. Date: Jul. 12, 2018

(65) Prior Publication Data
US 2020/0162900 A1 May 21, 2020

Related U.S. Application Data

(60) Provisional application No. 62/442,397, filed on Jan. 4, 2017.

(51) Int. Cl.
*H04W 12/02* (2009.01)
*H04W 68/02* (2009.01)
*H04W 12/72* (2021.01)

(52) U.S. Cl.
CPC ........... *H04W 12/02* (2013.01); *H04W 12/72* (2021.01); *H04W 68/02* (2013.01)

(58) Field of Classification Search
CPC ........... H04W 12/00514; H04W 12/02; H04W 68/02; H04L 63/0407; H04L 63/0414
See application file for complete search history.

(56) References Cited

U.S. PATENT DOCUMENTS

| 2014/0177569 A1* | 6/2014 | Lee ........................ | H04W 68/02 370/329 |
| 2015/0079941 A1* | 3/2015 | Arkko ................... | H04W 12/10 455/411 |
| 2019/0149521 A1* | 5/2019 | Jerichow ............... | H04W 12/02 713/171 |

FOREIGN PATENT DOCUMENTS

WO   2016209126 A1   12/2016

OTHER PUBLICATIONS

Foss, A. et al., "New Report: Clear Signs of Mobile Surveillance in Oslo, Despite Denial From Police Security Service", Jun. 26, 2015, pp. 1-15, retrieved on May 22, 2019, retrieved from internet: https://www.aftenposten.no/norge/i/kamWB/New-report-Clear-signs-of-mobile-surveillance-in-Oslo_-despite-denial-from-Police-Security-Service.

(Continued)

*Primary Examiner* — Erica Navar
(74) *Attorney, Agent, or Firm* — Coats & Bennett, PLLC

(57) ABSTRACT

A wireless device (16) configured to receive from a network node (20) a page (18) that includes a paging identifier (18A) 4 for the wireless device (16). The paging identifier (18A) may identify as a target of the page (18) a wireless device (16) associated with a particular subscriber. In fact, in some embodiments, the paging identifier (18A) is based on an encrypted subscription identifier for the wireless device (16) or is a pseudonym subscription identifier for the wireless (Continued)

device (16). In any event, the wireless device (16) is also configured to transmit to the network node (20) a response (22) to the page (18) that indicates the wireless device (16) was paged but that includes an identifier for the wireless device (16) that is different than the paging identifier (18A) included in the page (18).

16 Claims, 15 Drawing Sheets

(56) References Cited

OTHER PUBLICATIONS

Shaik, A. et al., "Practical Attacks Against Privacy and Availability in 4G/LTE Mobile Communication Systems", Aug. 7, 2017, pp. 1-16, retrieved on May 22, 2016, retrieved from internet: https://arxiv.org/abs/1510.07563.

3rd Generation Partnership Project, "3rd Generation Partnership Project; Technical Specification Group Services and System Aspects; Study on the Security Aspects of the Next Generation System (Release 14)", Technical Report, 3GPP TR 33.899 V1.3.0, Aug. 1, 2017, pp. 1-605, 3GPP.

Arapinis, M. et al., "New Privacy Issues in Mobile Telephony: Fix and Verification", Proceedings of 2012 ACM Conference on Computer and Communications Security, Oct. 16, 2012, pp. 1-12, ACM.

Norrman, K. et al., "Protecting IMSI and User Privacy in 5G Networks", Proceedings of the 9th EAI International Conference on Mobile Multimedia Communications, Jun. 18, 2016, pp. 1-8, ACM.

3rd Generation Partnership Project, "3rd Generation Partnership Project; Technical Specification Group Services and System Aspects; Study on the Security Aspects of the Next Generation System (Release 14)", Technical Report, 3GPP TR 33.899 V0.6.0, Nov. 1, 2016, pp. 1-375, 3GPP.

Mannesmann Mobilfunk, "Enhanced User Identity Confidentiality and IMSI-Paging", 3GPP TSG S3#6, Sophia-Antipolis, France, Sep. 29, 1999, pp. 1-2, S3-99314, 3GPP.

Barbeau, M. et al., "Perfect Identity Concealment in UMTS Over Radio Access Links", IEEE International Conference on Wireless and Mobile Computing, Networking and Communications, Aug. 22, 2005, pp. 1-6, IEEE.

3rd Generation Partnership Project, "3rd Generation Partnership Project; Technical Specification Group Core Network and Terminals; Non-Access-Stratum (NAS) Protocol for Evolved Packet System (EPS); Stage 3 (Release 14)", Technical Specification, 3GPP TS 24.301 V14.2.0, Dec. 1, 2016, pp. 1-470, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.0.0, Sep. 1, 2016, pp. 1-644, 3GPP.

3rd Generation Partnership Project, "3rd Generation Partnership Project; Technical Specification Group Radio Access Network; Evolved Universal Terrestrial Radio Access (E-UTRA); User Equipment (UE) Procedures in Idle Mode (Release 14)", Technical Specification, 3GPP TS 36.304 V14.1.0, Dec. 1, 2016, pp. 1-46, 3GPP.

* cited by examiner

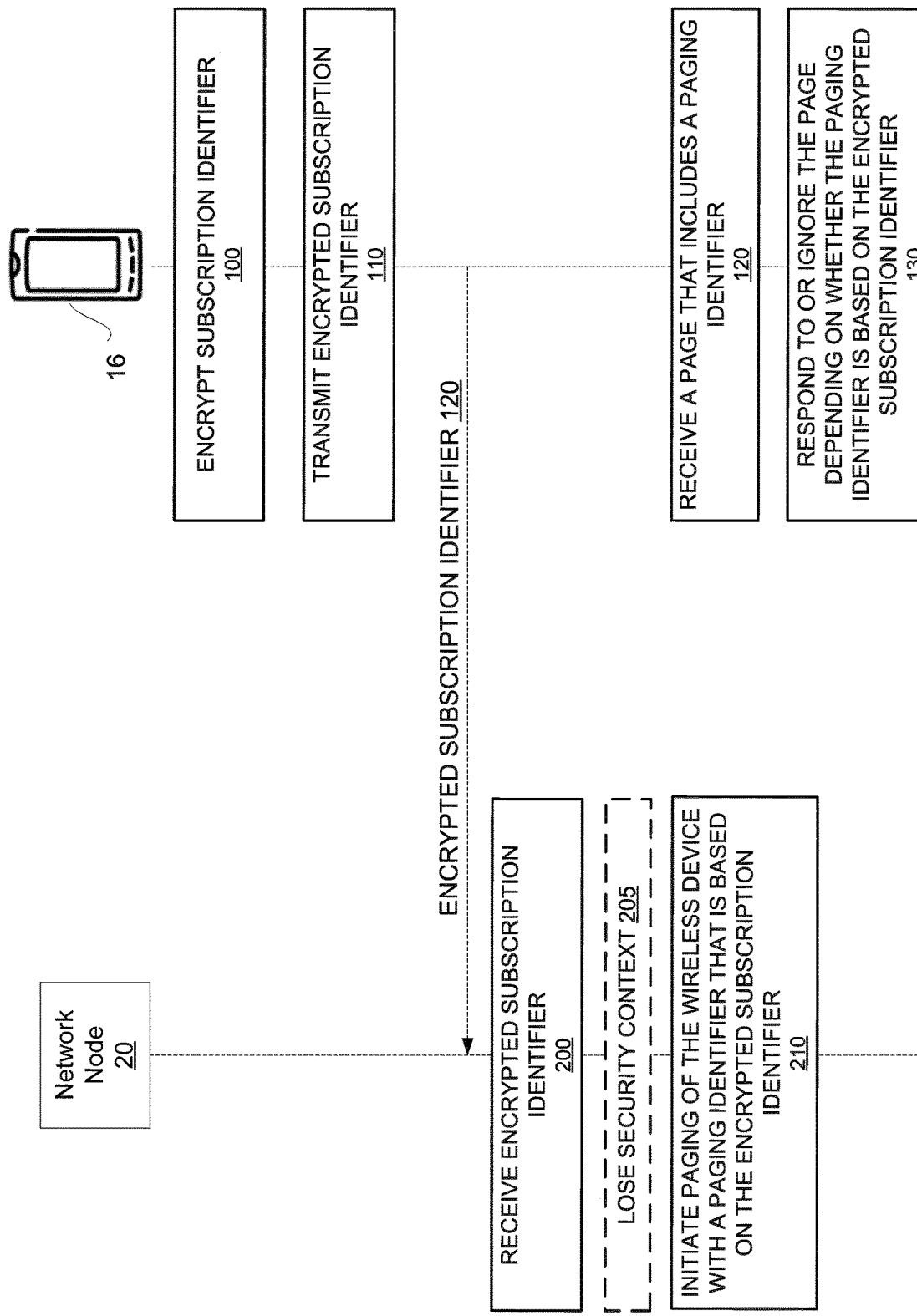

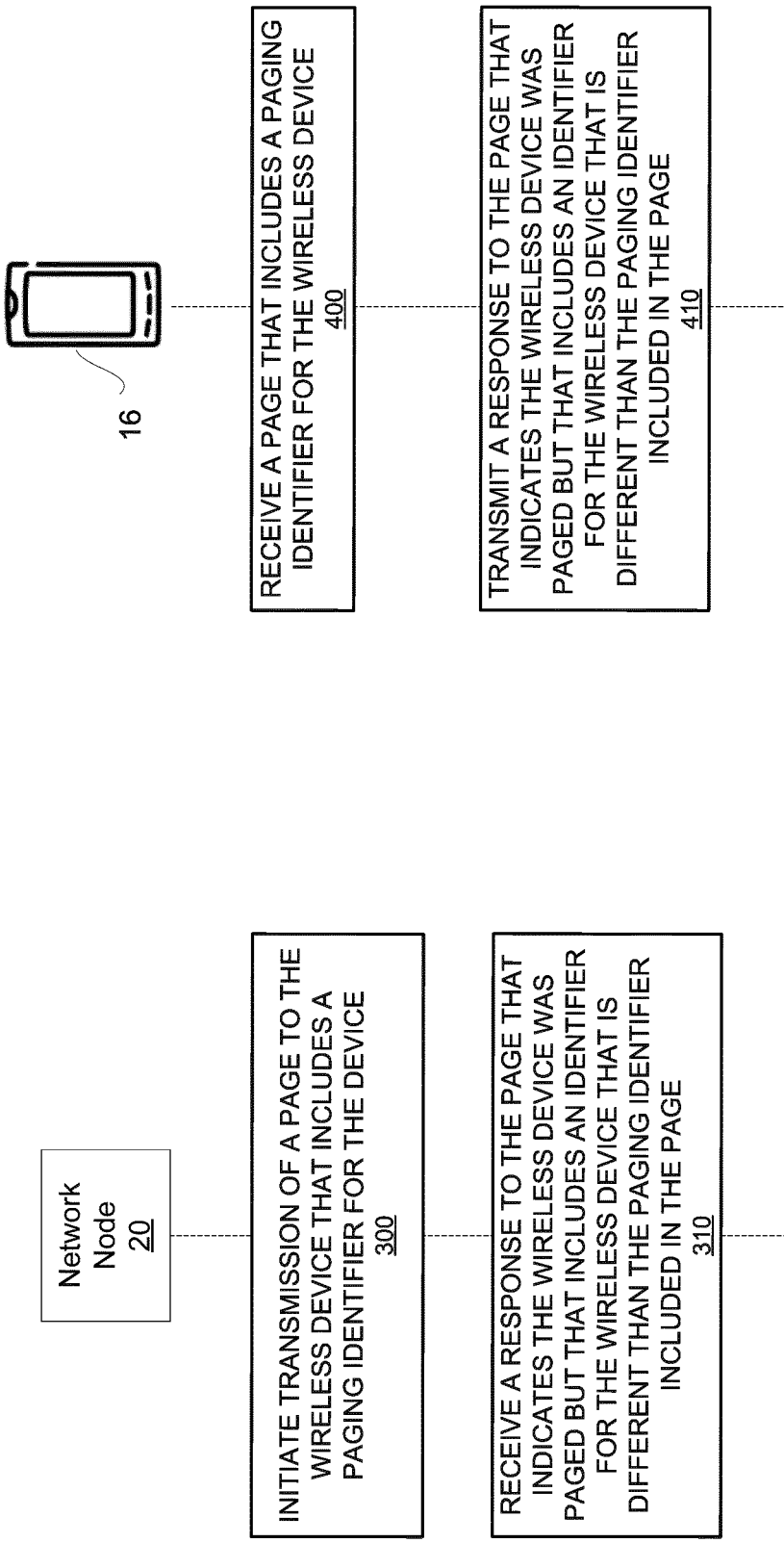

| Information Elements | Value |
|---|---|
| Paging Record List | Paging Record (up to 16). Each paging records contains:<br>- UE Identity (either S-TMSI or IMSI)<br>- Core Network Domain (either CS or PS) |
| SI (System Information) Modification Indication | Boolean |
| ETWS (Earthquake and Tsunami Warning System) Indication | Boolean |

*FIGURE 11*

| Information Elements | Value |
|---|---|
| UE Identity Index | 0 to 1023 |
| UE Paging Identity | S-TMSI or IMSI |
| Paging DRX | 32, 64, 128, 256 |
| Core Network Domain | PS or CS |
| List of Tracking Area Identities (TAI) | 1 to 256 instances |
| List of Closed Subscriber Group (CSG) Identities | 0 to 256 instances |

*FIGURE 12*

| ID used in / Case # | Initial/earlier message (e.g. attach) (Init) | <PAGING_WO_CTX> message (Page) | Response message (Resp) |
|---|---|---|---|
| 1 | ID_A | ID_B | ID_C |
| 2 | ID_A | ID_A | ID_B |
| 3 | ID_A | ID_B | ID_B |
| 4 | ID_A | ID_A | ID_A |

*FIGURE 13*

METHOD AND NETWORK NODE FOR PAGING IN A WIRELESS COMMUNICATION SYSTEM

RELATED APPLICATIONS

This application claims priority to U.S. Provisional Patent Application Ser. No. 62/422,397, filed Jan. 4, 2017, the entire contents of which are incorporated herein by reference.

TECHNICAL FIELD

The present application relates generally to a wireless communication system, and relates specifically to paging in a wireless communication system.

BACKGROUND

A subscription identifier in a wireless communication system identifies an individual subscriber associated with a wireless device. A serving network includes the subscription identifier within a paging message in order to page the device associated with the subscriber. The device may respond to the paging message with that same subscription identifier, to indicate that it was in fact the device that was paged.

To protect against eavesdroppers identifying and tracking the subscriber on the radio interface, though, the serving network may include in the paging message a subscription identifier that is only temporarily assigned to the subscriber, rather than including a subscription identifier that is assigned to the subscriber for a longer term. In Long Term Evolution (LTE) systems, for example, the serving network may assign a Temporary Mobile Subscriber Identity (TMSI) to the subscriber and include that TMSI in a paging message for the subscriber, rather than including the International Mobile Subscriber Identity (IMSI) assigned by the subscriber's home network for a longer term.

Under some circumstances, though, the serving network may not be able to page a device using a temporarily assigned subscription identifier. Before the temporary subscription identifier has been assigned, or when errors occur that cause the temporary subscription identifier to be lost, the serving network would heretofore have to resort to paging a device using a subscription identifier assigned over a longer term (e.g., using the IMSI). Moreover, even if the serving network does use a temporary subscription identifier to page the device, responding to the page with that same identifier provides an opportunity for eavesdroppers to track the subscriber. Known approaches to paging may therefore still expose a subscriber to attacks on his or her privacy.

SUMMARY

It is an object of one or more embodiments herein to page a wireless device in a way that preserves the privacy of the wireless device (e.g., in terms of the device's location). One or more embodiments herein thereby page a wireless device with a paging identifier that is based on an encrypted subscription identifier (or a pseudonym subscription identifier). In some embodiments, the device may be paged in this way, for example, even if the device's serving network is unable to page the device using a temporarily assigned subscription identifier and/or even if the serving network lacks a security context for the device (e.g., including security keys). Alternatively or additionally, a wireless device may respond to a page using a different subscription identifier than that included in the page. According to some embodiments, paging and/or responding to a page in this way may advantageously protect the subscriber's privacy.

More particularly, embodiments herein include a method performed by a wireless device. The method comprises receiving from a network node a page that includes a paging identifier for the wireless device. The paging identifier may identify as a target of the page a wireless device associated with a particular subscriber. In fact, in some embodiments, the paging identifier is based on an encrypted subscription identifier for the wireless device or is a pseudonym subscription identifier for the wireless device. In any event, the method further comprises transmitting to the network node a response to the page that indicates the wireless device was paged but that includes an identifier for the wireless device that is different than the paging identifier included in the page.

In some embodiments, the response includes an identifier that is based on an encrypted subscription identifier, the page is initiated by a network node, and the method further comprises transmitting the encrypted subscription identifier from the wireless device to the network node prior to receiving the page. In other embodiments, the response includes an identifier that is based on an encrypted subscription identifier, the page is initiated by a network node, and the method further comprises transmitting a different encrypted subscription identifier from the wireless device to the network node prior to receiving the page.

In some embodiments, the page is initiated by the network node, and the method further comprises determining whether to respond to or ignore the page depending on whether the paging identifier is based on the pseudonym subscription identifier for the wireless device, wherein the pseudonym subscription identifier is associated with the wireless device's home network. In one embodiment, for example, the method further comprises transmitting the pseudonym subscription identifier to the network node. This may involve for instance transmitting the pseudonym subscription identifier to the network node during an attachment procedure or an authentication procedure.

Embodiments herein also include a method performed by a network node. The method comprises initiating transmission of a page to a wireless device that includes a paging identifier for the wireless device. The paging identifier may identify as a target of the page a wireless device associated with a particular subscriber. In fact, in some embodiments, the paging identifier is based on an encrypted subscription identifier for the wireless device or is a pseudonym subscription identifier for the wireless device. Regardless, the method also comprises receiving a response to the page that indicates the wireless device was paged but that includes an identifier for the wireless device that is different than the paging identifier included in the page.

In some embodiments, the response includes an identifier that is based on an encrypted subscription identifier, and the method further comprises receiving the encrypted subscription identifier from the wireless device prior to receiving the page. In other embodiments, the response includes an identifier that is based on an encrypted subscription identifier, and the method further comprises receiving a different encrypted subscription identifier from the wireless device prior to receiving the page.

In some embodiments, the paging identifier is based on the pseudonym subscription identifier, and the method further comprises receiving the pseudonym subscription identifier, wherein the pseudonym subscription identifier is associated with the wireless device's home network. For example, in one embodiment, the method comprises receiving the pseudonym subscription identifier from the wireless device, e.g., during an attachment procedure or an authentication procedure. In other embodiments, the method comprises receiving the pseudonym subscription identifier from the wireless device's home network.

In any of the embodiments for the method performed by the wireless device or the network node, the page is initiated by a network node, and the paging identifier is based on an encrypted subscription identifier that the wireless device transmitted to the network node prior to receiving the page. In one embodiment, for example, the paging identifier is the encrypted subscription identifier. In another embodiment, the paging identifier is a part of the encrypted subscription identifier. In still another embodiment, the paging identifier is a transformation of the encrypted subscription identifier. For example, the paging identifier may be a hashed or compressed version of the encrypted subscription identifier. In any of these embodiments, the encrypted subscription identifier may be encrypted, at least in part, with a key associated with the wireless device's home network. In any of these embodiments, the response may include a different encrypted subscription identifier for the wireless device. In other embodiments, the response includes a pseudonym subscription identifier for the wireless device that is different than the paging identifier and that is associated with the wireless device's home network.

In other embodiments for the method performed by the wireless device or the network node, the paging identifier is a pseudonym subscription identifier for the wireless device. The pseudonym subscription identifier may be associated with the wireless device's home network. In one such embodiment, the response includes a different pseudonym subscription identifier for the wireless device that is associated with the wireless device's home network. In another embodiment, though, the response includes an identifier that is based on an encrypted subscription identifier. In one embodiment, for example, the paging identifier is the encrypted subscription identifier. In another embodiment, the paging identifier is a part of the encrypted subscription identifier. In still another embodiment, the paging identifier is a transformation of the encrypted subscription identifier. For example, the paging identifier may be a hashed or compressed version of the encrypted subscription identifier. In any of these embodiments, the encrypted subscription identifier may be encrypted, at least in part, with a key associated with the wireless device's home network.

Embodiments also include corresponding apparatus, computer programs, and carriers. For example, embodiments include a wireless device configured to receive from a network node a page that includes a paging identifier for the wireless device. The paging identifier may identify as a target of the page a wireless device associated with a particular subscriber. In fact, in some embodiments, the paging identifier is based on an encrypted subscription identifier for the wireless device or is a pseudonym subscription identifier for the wireless device. In any event, the wireless device is also configured to transmit to the network node a response to the page that indicates the wireless device was paged but that includes an identifier for the wireless device that is different than the paging identifier included in the page.

Embodiments further include a network node. The network node is configured to initiate transmission of a page to a wireless device that includes a paging identifier for the wireless device. The paging identifier may identify as a target of the page a wireless device associated with a particular subscriber. In fact, in some embodiments, the paging identifier is based on an encrypted subscription identifier for the wireless device or is a pseudonym subscription identifier for the wireless device. Regardless, the network node is also configured to receive a response to the page that indicates the wireless device was paged but that includes an identifier for the wireless device that is different than the paging identifier included in the page.

BRIEF DESCRIPTION OF THE DRAWINGS

FIG. 2 is a logic flow diagram of a method performed by a network node according to some embodiments.

FIG. 3 is a logic flow diagram of a method performed by a wireless device according to some embodiments.

FIG. 4 is a logic flow diagram of a method performed by a network node according to other embodiments.

FIG. 5 is a logic flow diagram of a method performed by a wireless device according to other embodiments.

FIG. 11 is a block diagram of information elements for an RRC Paging message according to some embodiments.

FIG. 12 is a block diagram of information elements for an S1 Paging message according to some embodiments.

FIG. 13 is a table of different possible embodiments for identifiers to use in a paging message and in a response to the paging message.

DETAILED DESCRIPTION

Figure 1:
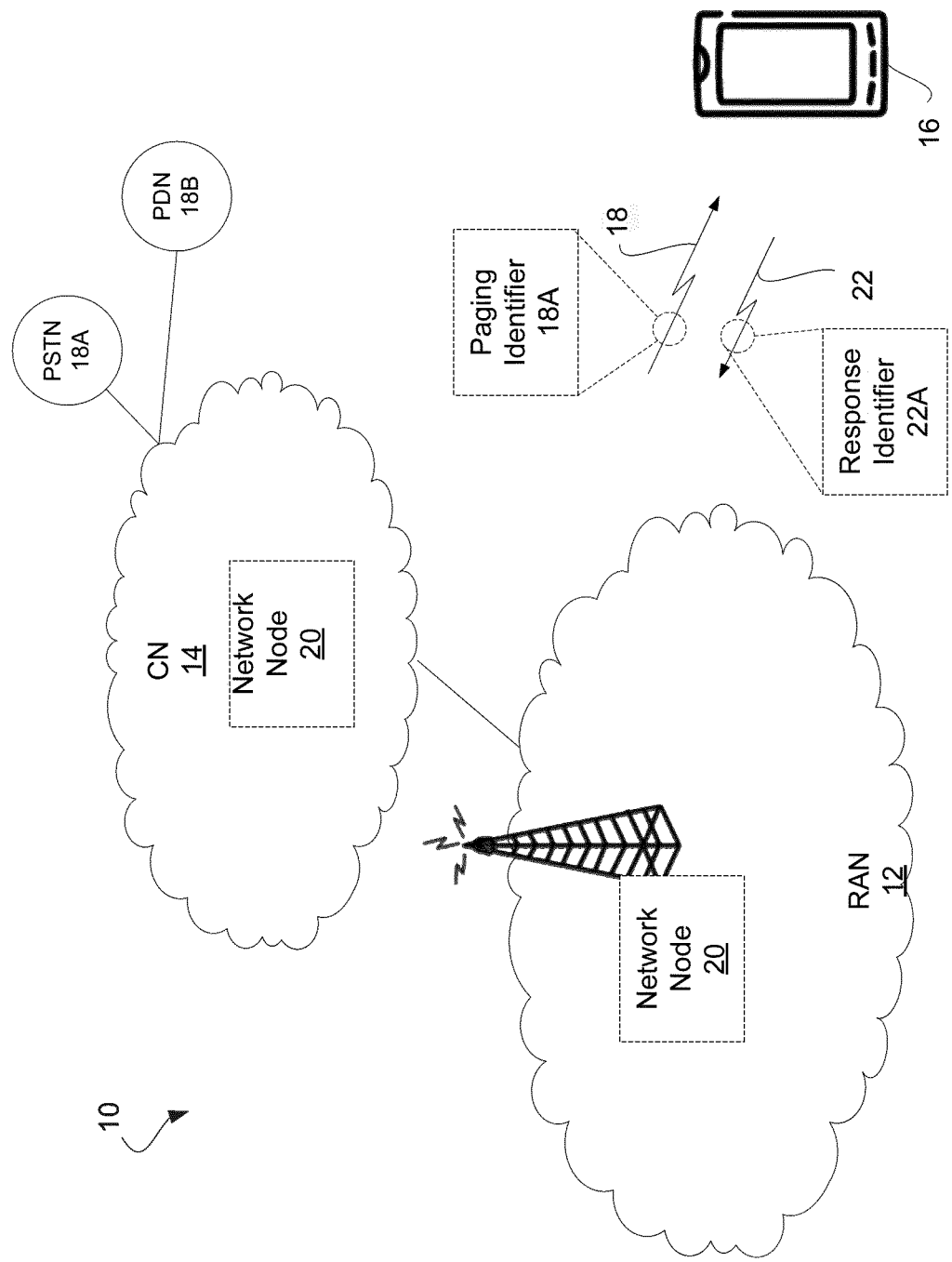
FIG. 1 is a block diagram of a wireless communication system that includes a wireless device and a network node according to some embodiments.

FIG. 1 illustrates a wireless communication system 10 according to one or more embodiments. As shown in FIG. 1, the system 10 (e.g., an LTE or 5G system) includes a radio access network (RAN) 12 and a core network (CN) 14. The RAN 12 wirelessly connects one or more wireless communication devices 16 (or simply "wireless devices") to the CN 14. The CN 14 in turn connects the one or more wireless devices 16 to one or more external networks 18A, 18B. As shown, these one or more external networks 18A, 18B include a public switched telephone network (PSTN) 18A and a packet data network (PDN) 18B, such as the Internet.

A network node 20 in the RAN 12 or CN 14 may initiate paging of a wireless device 16, e.g., to trigger the device 16 to attach for receiving a call. The network node 20 may be for instance a node in the device's serving network, such as a mobility management entity (MME) in LTE-based networks, or a node with similar functionality in 5G networks. Regardless, paging entails transmission of a paging message 18 (or simply "page") to the wireless device 16. The page 18 includes a paging identifier 18A. The paging identifier 18A identifies the target of the page 18, e.g., a particular wireless device used by or otherwise associated with a particular subscriber. A wireless device 16 examines the paging identifier 18A to determine whether the device 16 is the target of the page 18. If the device 16 is not the target of the page 18, the device 16 may simply ignore the page 18. Otherwise, if the device 16 is the target of the page 18, the device 16 may respond to the page 18 by transmitting a response message 22 (or simply "response"). The response 22 includes a response identifier 22A. The response identifier 22A identifies the responder to the page 18.

According to one or more embodiments herein, the paging identifier 18A is based on an encrypted subscription identifier or a pseudonym subscription identifier. The encrypted subscription identifier may be for instance an encrypted version of a subscription identifier assigned to the identified subscription by the home network for that subscription, e.g., for a relatively long or non-temporary term. The encrypted subscription identifier may be for instance an encrypted International Mobile Subscriber Identity (IMSI). The encrypted subscription identifier in some embodiments may be encrypted with a (user-specific) key associated with the home network (e.g., a public key paired with a private key used for decryption). A pseudonym subscription identifier by contrast may be a subscription identifier designated as a pseudonym or alias for the subscription identifier assigned by the home network. The pseudonym subscription identifier may be tied to the home network, in the sense that it may be assigned by the home network or generated based on a security key (e.g., $K_{ASME}$) shared with the home network.

The paging identifier 18A may be based on such an encrypted or pseudonym subscription identifier, even when the network node 20 lacks a security context for the wireless device 16. Without a security context for the device 16 at the network node 20, the network node 20 lacks security keys (e.g., $K_{ASME}$) for securely communicating with the device 16, e.g., by encrypting or decrypting signaling in the paging procedure. Despite this, the network node 20 in some embodiments may receive the encrypted or pseudonym subscription identifier, e.g., in encrypted or pseudonym form, and may still use that identifier for paging the device 16. The network node 20 may do so even if the network node 20 is unable to decrypt or otherwise understand the encrypted or pseudonym subscription identifier, beyond the fact that the identifier concerns the particular device 16. Indeed, the network node 20 may not be required to decrypt or understand the identifier as long as the wireless device 16 has the identifier and/or detects when it is paged based on that identifier.

In some embodiments, for example, the network node 20 may have previously received the encrypted or pseudonym subscription identifier. The network node 20 may have previously received the identifier for instance during, or as part of establishing, a security context at the network node 20 for the device 16. After that security context is lost at the network node 20 and/or when the network node 20 lacks a temporary subscription identifier for the device 16, the network node 20 may re-use the previously received identifier for paging the device 16, by basing the paging identifier 18A on the identifier.

More particularly in this regard, the network node 20 may have received the encrypted or pseudonym subscription identifier from the wireless device 16 (e.g., during a previous attachment procedure or authentication procedure) or from the home network (e.g., home subscriber server, HSS). Where the network node 20 does not decrypt or understand the received subscription identifier, e.g., due to its encrypted or pseudonym form, the network node 20 may simply (and naively) store whatever subscription identifier it has received. Then, no matter whether the network node 20 understands the received subscription identifier, other than the fact that it concerns the wireless device 16, the network node 20 may re-use that identifier by generating the paging identifier 18A based on it.

In one embodiment, the network node 20 may generate the paging identifier 18A to be, or to be a portion of, the same encrypted or pseudonym subscription identifier that it previously received. In this case, the device 16 may check whether the paging identifier 18A matches the encrypted or pseudonym subscription identifier, at least in part, that the device 16 previously sent to the network node 20. Such matching in some embodiments may not even require the device 26 to decrypt the paging identifier 18A. In another embodiment, by contrast, the network node 20 may generate the paging identifier 18A to be, or to be a portion of, a different encrypted or pseudonym subscription identifier that is mapped to or otherwise associated (e.g., in the same identifier set) with the encrypted or pseudonym subscription identifier that it previously received. See, e.g., case #1 below where Identifier(Init), Identifier(Page), and Identifier (Resp) are all different.

In view of the above variations, Figures B-C illustrate some embodiments where the paging identifier 18A is based on an encrypted subscription identifier received by the network node 20 from the wireless device 16. As shown in FIG. 3, processing by the wireless device 16 includes encrypting a subscription identifier for the wireless device to obtain an encrypted subscription identifier (Block 100). Processing by the wireless device 16 also includes transmitting the encrypted subscription identifier to the network node 20 (Block 110). Referring now to FIG. 2, processing by the network node 20 correspondingly includes receiving the encrypted subscription identifier from the wireless device 16 (Block 200). This may occur for instance during, or as part of establishing, a security context at the network node 20 for the device 16 and/or during an attachment or authentication procedure.

After receiving the encrypted subscription identifier, the network node 20 may in some embodiments lose the security context for the device 16 at the network node 20 (Block 205). Regardless, processing at the network node 20 may thereafter include initiating paging of the wireless device 16 with a paging identifier that is based on the encrypted subscription identifier (Block 210). The network node 20 may for instance form the paging identifier to be, or to be a portion or transformation of, the encrypted subscription identifier previously received from the device 16. Initiation of such paging may involve for instance transmitting the page from the network node 20 itself (e.g., if in the RAN) or instructing another node to transmit the page with the paging identifier (e.g., if the network node 20 is in the CN). In any event, processing at the wireless device 16 correspondingly includes receiving a page that includes a paging identifier (Block 120). Processing then further includes responding to or ignoring the page depending on whether the paging identifier is based on the encrypted subscription identifier (Block 130). In some embodiments, for example, this entails determining whether the paging identifier matches the encrypted subscription identifier, at least in part, and responding to or ignoring the page depending on whether the paging identifier matches the encrypted subscription identifier according to the determining. In fact, the device 16 may not need to decrypt or even attempt to decrypt the paging identifier.

Note that in at least some embodiments the encrypted subscription identifier is larger than the unencrypted subscription identifier. In these and other embodiments, therefore, the network node 20 may determine (e.g., generate) the paging identifier 18A to be unique from one or more other paging identifiers with which the network node 20 is to page one or more other wireless devices, e.g., within the same paging area as the wireless device 16 and/or at substantially the same time as the network node 20 is to page the wireless device 16. The network node 20 may for instance dynamically determine a length of the paging identifier to be as long as needed to avoid collision with the one or more other paging identifiers. Where the paging identifier is determined to be a portion of the encrypted subscription identifier (e.g., the least or most significant bits), for example, the network node 20 may choose the smallest portion as possible yet still avoid collision with other paging identifiers. This may effectively compress the paging identifier to the extent possible while avoiding identifier collision.

Alternatively or additionally to the embodiments above, still other embodiments herein have the wireless device 16 respond to the page with a response identifier 22A that is different than the paging identifier 18A. The response identifier 22A may be for instance an encrypted subscription identifier or a pseudonym subscription identifier, similarly to that described above, provided the identifier 22A differs from the paging identifier 18A. According to some embodiments, paging and/or responding to a page in this way may advantageously protect the subscriber's privacy.

FIGS. 4-5 illustrate exemplary embodiments in this regard. As shown, processing at the network node 20 includes initiating transmission of a page 18 to a wireless device 16 that includes a paging identifier 18A for the wireless device 16 (Block 300). The paging identifier 18A may identify as a target of the page 18 a wireless device 16 associated with a particular subscriber. In fact, in some embodiments, the paging identifier 18A is based on an encrypted subscription identifier for the wireless device 16 or is a pseudonym subscription identifier for the wireless device 16. In any event, processing at the wireless device 16 correspondingly includes receiving a page 18 that includes a paging identifier 18A for the wireless device 16 (Block 400).

Processing at the wireless device 16 further includes transmitting a response 22 to the page 18 that indicates the wireless device 16 was paged but that includes an identifier 22A for the wireless device 16 that is different than the paging identifier 18A included in the page 18 (Block 410). That is, even though the response 22 indicates the device 16 was paged, the response 22 includes an identifier 22 different than the paging identifier 18A. Processing at the network node 20 correspondingly includes receiving such a response 22 (Block 310).

Note that a network node 20 herein is any type of node in the RAN (e.g., a base station) or CN (e.g., MME). Where the network node is a radio network node in the RAN, the node 20 may be capable of communicating with another node over radio signals. A wireless device 16 is any type device capable of communicating with a radio network node over radio signals. A wireless device 16 may therefore refer to a machine-to-machine (M2M) device, a machine-type communications (MTC) device, a narrowband Internet of Things (NB-IoT) device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that the network node 20 as described above may perform the processing herein by implementing any functional means or units. In one embodiment, for example, the network node 20 comprises respective circuits configured to perform the steps shown in FIGS. 2 and/or 4. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the network node 20 contains instructions executable by the processing circuitry network node 20 is configured to carry out the processing herein.

Figure 6:
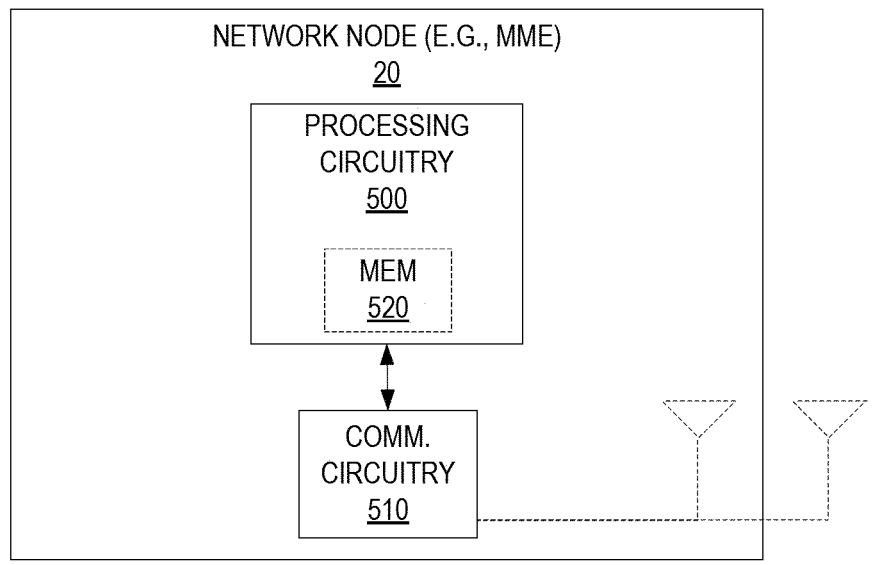
FIG. 6 is a block diagram of a network node according to some embodiments.

FIG. 6 illustrates additional details of a network node 20 in accordance with one or more embodiments. As shown, the network node 20 includes one or more processing circuits 500 and communication circuitry 510. The communication circuitry 510 is configured to communication with one or more other nodes, e.g., the wireless device 16 and/or a radio network node. Where the network node 20 is a radio network node, the communication circuitry 510 is configured to transmit and/or receive via one or more antennas. The one or more processing circuits 500 are configured to perform processing described above, e.g., in FIGS. 2 and/or 4, such as by executing instructions stored in memory 520. The one or more processing circuits 500 in this regard may implement certain functional means or units.

Figure 7:
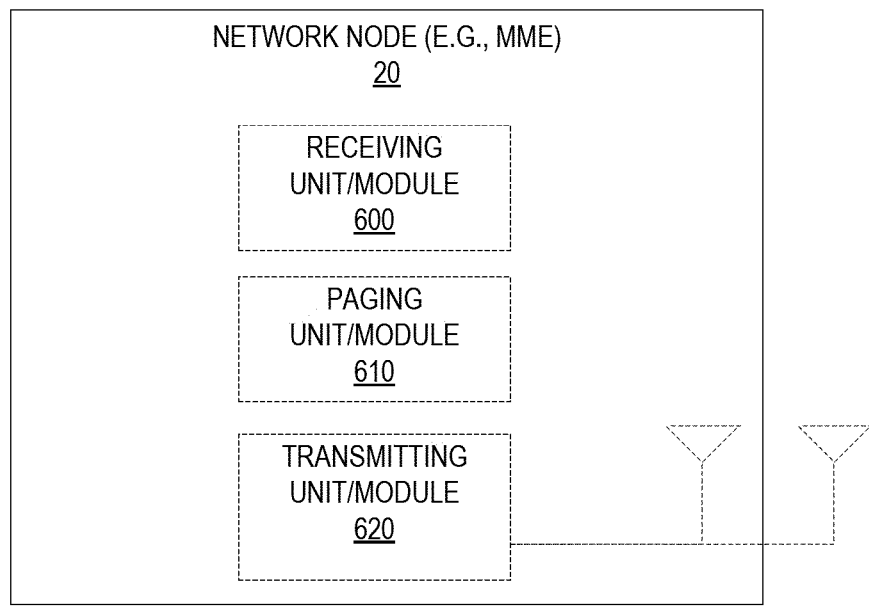
FIG. 7 is a block diagram of a network node according to other embodiments.

FIG. 7 in this regard illustrates a network node 20 in accordance with one or more other embodiments. As shown, the network node 20 may include a receiving unit or module 600, a paging unit or module 610, and/or a transmitting unit or module 620 configured to perform the receiving, paging initiation, and/or transmitting discussed above. These modules or units may be implemented by the processing circuit (s) 500 of FIG. 6.

More particularly, when the network node 20 is configured for performing the processing described in FIG. 2, the receiving unit or module 600 may be for receiving an encrypted subscription identifier from the wireless device 16, e.g., during, or as part of establishing, a security context at the network node 20 for the device 16 and/or during an attachment or authentication procedure. The paging unit or module 610 may be for initiating paging of the wireless device 16 with a paging identifier that is based on the encrypted subscription identifier. In some embodiments, the transmitting unit or module 620 may be for actually transmitting such a page to the wireless device 16.

Alternatively or additionally, when the network node 20 is configured for performing the processing described in FIG. 4, the paging unit or module 610 may be for initiating transmission of a page 18 to a wireless device 16 that includes a paging identifier 18A for the wireless device 16. The paging identifier 18A may identify as a target of the page 18 a wireless device 16 associated with a particular subscriber. In fact, in some embodiments, the paging identifier 18A is based on an encrypted subscription identifier for the wireless device 16 or is a pseudonym subscription identifier for the wireless device 16. In any event, in some embodiments, the transmitting unit or module 620 may be for actually transmitting such a page to the wireless device 16. The receiving unit or module 600 may be for receiving a a response 22 to the page 18 that indicates the wireless device 16 was paged but that includes an identifier 22A for the wireless device 16 that is different than the paging identifier 18A included in the page 18.

Also, the wireless communication device 16 may perform the processing herein by implementing any functional means or units. In one embodiment, for example, the wireless communication device 16 comprises respective circuits configured to perform the steps shown in FIGS. 3 and/or 5. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the device 16 contains instructions executable by the processing circuitry whereby the device 16 is configured to carry out the processing herein.

Figure 8:
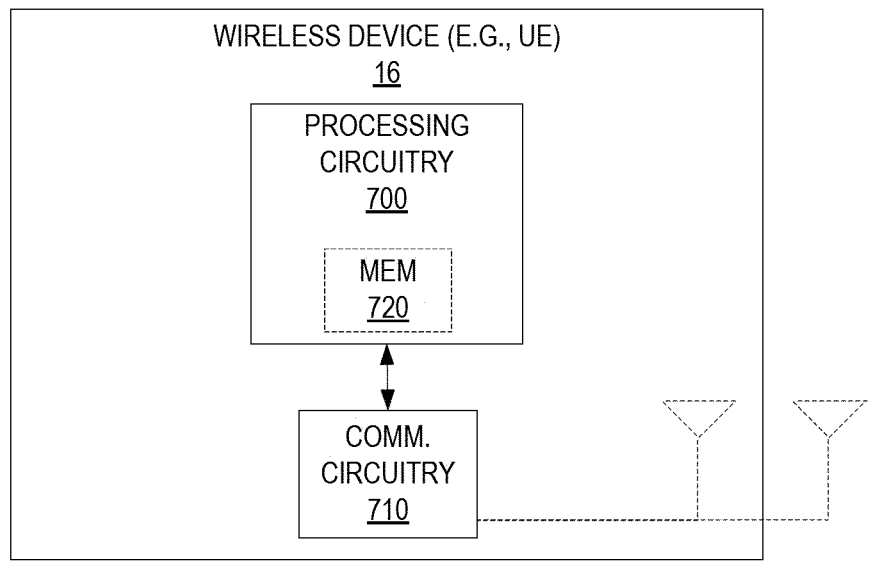
FIG. 8 is a block diagram of a wireless device according to some embodiments.

FIG. 8 illustrates additional details of a wireless communication device 16 in accordance with one or more embodiments. As shown, the wireless communication device 16 includes one or more processing circuits 700 and communication circuitry 710 (e.g., one or more radio circuits). The communication circuitry 710 may be configured to transmit via one or more antennas. The one or more processing circuits 700 are configured to perform processing described above, e.g., in FIGS. 3 and/or 5, such as by executing instructions stored in memory 720. The one or more processing circuits 700 in this regard may implement certain functional means or units.

Figure 9:
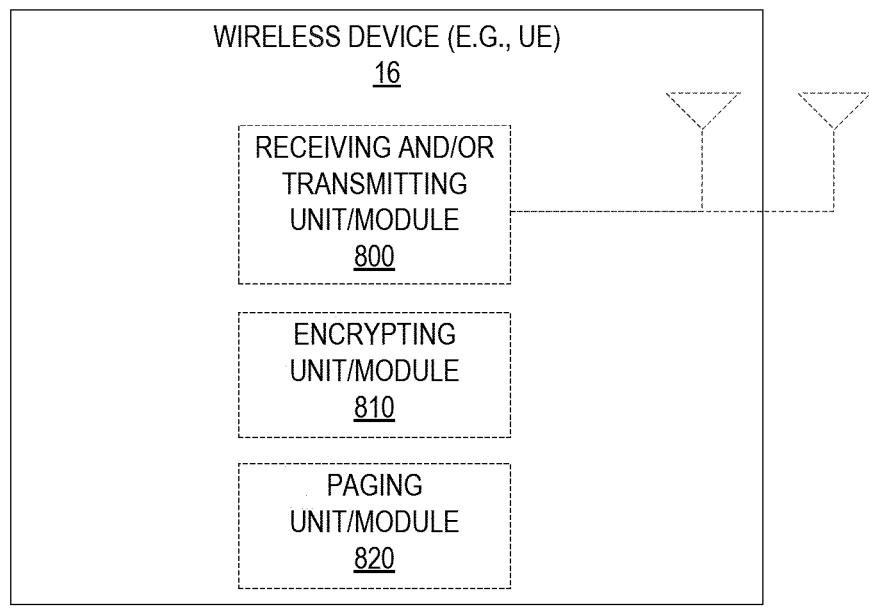
FIG. 9 is a block diagram of a wireless device according to other embodiments.

FIG. 9 in this regard illustrates additional details of a wireless communication device 16 in accordance with one or more other embodiments. As shown, the device 16 may include a receiving and/or transmitting unit or module 800, an encrypting module or unit 810, and/or a paging unit or module 820 for performing the transmitting, receiving, encrypting, and/or paging response functions described above. These units or modules may be implemented by the one or more processing circuits 700 in FIG. 8.

More particularly, when the wireless communication device 16 is configured for performing the processing described in FIG. 3, the encrypting module or unit 810 may be for encrypting a subscription identifier for the wireless device 16 to obtain an encrypted subscription identifier, and the transmitting unit or module 800 may be for transmitting the encrypted subscription identifier to the network node 20. The receiving unit or module 800 may be for receiving a page that includes a paging identifier. The paging unit or module 820 may be for responding to or ignoring the page depending on whether the paging identifier is based on the encrypted subscription identifier.

Alternatively or additionally, when the wireless communication device 16 is configured for performing the processing described in FIG. 5, The receiving unit or module 800 may be for receiving a page 18 that includes a paging identifier 18A for the wireless device 16. The paging identifier 18A may identify as a target of the page 18 a wireless device 16 associated with a particular subscriber. In fact, in some embodiments, the paging identifier 18A is based on an encrypted subscription identifier for the wireless device 16 or is a pseudonym subscription identifier for the wireless device 16. In any event, the transmitting unit or module 800 in this case may be for transmitting a response 22 to the page 18 that indicates the wireless device 16 was paged but that includes an identifier 22A for the wireless device 16 that is different than the paging identifier 18A included in the page 18.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Other embodiments will now be described with respect to certain contexts. These embodiments are combinable with and expound upon embodiments above.

Current cellular networks occasionally (e.g. in initial attach messages) need to make use of a long-term subscriber identity (e.g., International Mobile Subscriber Identity, IMSI). Use of a long-term subscriber identity risks negative impacts on user privacy and traceability. One technique for improvement is that the UE (User Equipment) sends to the network an encrypted IMSI or a pseudonym IMSI to hide the clear-text IMSI during the attach procedure. Another technique may be that the UE uses a combination of both the encrypted IMSI and the pseudonym IMSI, i.e. it sends encrypted IMSI when the pseudonym IMSI is not available, otherwise it sends pseudonym IMSI. Such mechanisms are in principle capable of hiding the IMSI end-to-end, i.e. no one else than the UE and the home-network (e.g. HSS in LTE) are aware of the clear-text IMSI.

However, in order to comply with the lawful interception requirement, the serving network needs to know the clear-text IMSI since it provides assurance that the right target subscriber is intercepted, making end-to-end protection difficult from a practical point of view. The home network (e.g. HSS in LTE) may therefore reveal the clear-text IMSI or the pseudonym IMSI to the serving network (e.g. MME in LTE) to meet this requirement.

After the currently 3GPP-standardized attach procedure, authentication of the UE is performed and security (ciphering) is switched on. From that point on, the serving network can assign its own temporary identifier (e.g. System Architecture Evolution TMSI, S-TMSI, or Globally Unique Temporary Identifier, GUTI, in LTE) to the UE avoiding the use of IMSI. Indeed, even if the IMSI is used in protected messages, it is not accessible to $3^{rd}$ parties due to the ciphering.

However, while the above outlined solutions thus protect those critical cases where the UE normally would provide its IMSI on the uplink (to the network) without ciphering, there remains situations where the IMSI may also be used on the downlink (from the network) during paging.

In LTE (Long-term Evolution 3GPP standard), such as described in TS 24.301, TS 36.331, and TS 36.304, Paging is used to initiate a mobile terminated PS (packet switched) call, initiate a mobile terminated CS (circuit switched) fallback call, trigger an LTE UE to re-acquire system information, and provide an Earthquake and Tsunami Warning System (ETWS) indication.

Figure 10:
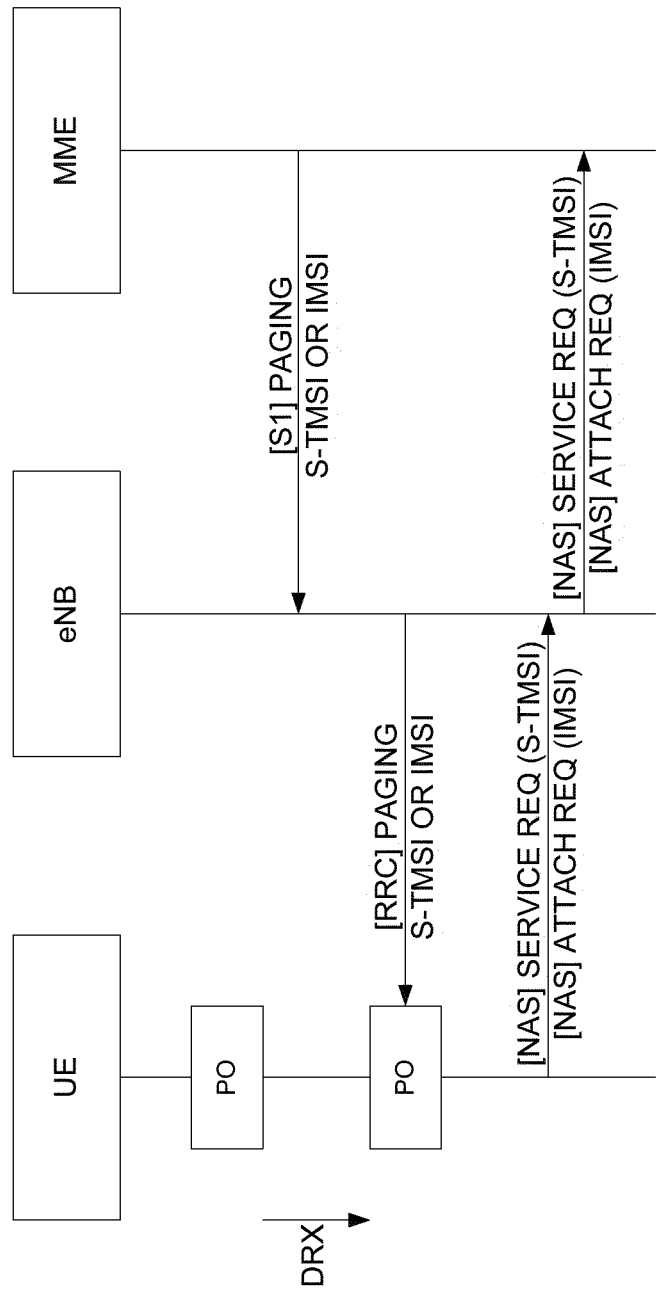
FIG. 10 is a call flow diagram for a paging procedure according to some embodiments.

FIG. 10 illustrates the Paging procedure used heretofore in an LTE system. As shown, the MME (Mobility Management Entity) initiates the Paging procedure and tells the eNB to Page a certain UE by sending the UE identifier in an S1 Paging message (S1 is the interface between core and radio networks). The eNB (base station) then sends an RRC Paging message over-the-air, for receipt by the UE during a paging occasion (PO), e.g., in between discontinuous reception (DRX) periods. In response to the RRC Paging message, the UE may send a non-access stratum (NAS) Service request (e.g., including its S-TMSI) or a NAS attach request (e.g., including its IMSI) to the eNB, which may in turn forward the request to the MME.

The RRC Paging message (Radio Resource Control, sent over the radio interface) is illustrated in FIG. 11. As shown in FIG. 11, one RRC Paging message can contain up to 16 UE identifiers (either the S-TMSI or IMSI). Therefore, the eNB can Page several UEs in "batch" fashion. To this end, a Paging Frame (PF) is one radio frame, which may contain one or multiple Paging Occasion(s). A Paging Occasion (PO) is a subframe where there may be a paging message. Thus, together, PF and PO give the exact timing of when the UE has to wake up from DRX to receive a potential Paging message directed to it from the MME via the eNB. There is always one PF and one PO for a UE in a DRX cycle. The DRX (Discontinuous Reception) cycle is used to save UE battery and determines how frequently the UE uses its receiver to check for Paging messages. The value of the Default DRX cycle is broadcasted in System Information Block 2 (SIB2). By default, the UE checks for Paging message every ~0.32 seconds to ~2.56 seconds, depending on the setting. The UE can also propose its own DRX cycle within an Attach Request and TAU (Tracking Area Update) Request.

The S1 Paging message is illustrated in FIG. 12. As shown in FIG. 12, the MME sends the UE Identity Index and the UE Paging Identity among other information to the eNB. The UE Identity Index is used at the eNB to calculate Paging Frame and is defined as (UE Identity Index=IMSI mod 1024). The UE can calculate the UE Identity Index itself to determine its Paging Frame. The UE Paging Identity is either the S-TMSI or the fixed IMSI. When the UE is Paged using the S-TMSI, the UE sends a service request to the network and identifies itself using the same S-TMSI. When the UE is Paged using the IMSI, the UE sends an attach request to the network and identifies itself using the same IMSI.

In normal scenarios, when the MME has the UE's context, S-TMSI Paging is sufficient and in those cases, privacy can be maintained reasonably well. However, IMSI based Paging still exists, to cover the following abnormal cases: when the MME loses the UE context, but MSC still recognizes/associates the UE with its IMSI and there is mobile terminating circuit switched (CS) service; and when the MME loses the UE context, but the serving gateway (S-GW) still recognizes/associates the UE with its IMSI and there is mobile terminating packet switched (PS) service.

One or more embodiments address privacy issues when IMSI based Paging is used, or in general, when the network Pages the mobile device, without the network having the mobile device's context.

Note that some embodiments herein are described in a 4G/LTE context by referring to network entities in the 4G network architecture such as MME, HSS, etc. Since embodiments herein also target other contexts such as future 5G networks, it is to be understood that references to 4G-specific network entities should be interpreted as generic entities that may perform corresponding functionality in a 5G (or other) setting. For example, MME should be construed as a network entity responsible for performing or initiating Paging of UEs. Any embodiments discussed with regard to the term MME may also be applied to the network node 20 in FIG. 1, and vice versa. UE should be construed as a mobile device. Any embodiments discussed with regard to the term UE may also be applied to a wireless device 16 in FIG. 1, and vice versa. HSS should be construed as a server function managing subscriptions of users such as authentication and identity management, etc. Finally, eNB should be construed as a radio base station or access point of a serving network, providing radio connectivity between the device and the rest of the network. Likewise, UE is not limited to a 3GPP User Equipment, but could be any form of (mobile) device connected to the network.

Additionally, while the description discusses Paging in the context of the 4G network where the core network entity (i.e. MME in the serving network) is responsible for initiating the Paging, it is to be understood that in any enhancement of the 4G networks or future 5G networks, the network entity responsible for initiating Paging could be either a core network entity (e.g. MME in LTE) or a radio access network entity (e.g. eNB in LTE), or, indeed, even an entity in the home network.

Accordingly, the description below shall refer only to IMSI identifiers used in cellular networks, though as will be apparent to those of skill in the art, the discussion applies also to other identifiers in other systems which may be in need to Page devices from the network side using some form of long-term identifier of the UE.

Moreover, embodiments described above (e.g., with respect to FIGS. 10-12) may be combined with or elaborated upon by the embodiments below.

In the rest of text, therefore, the term UE_LTID as used herein means a long-term identifier of the UE associated with the UE's home network. An example in a cellular network is the UE's IMSI. A UE_LTID may be one example of a "subscription identifier" as used herein.

The term PAGING_WO_CTX as used herein means that the UE is Paged by the network without the network having the UE's context (i.e. security keys, capabilities, etc.). An example in a cellular network is the IMSI based Paging in LTE, where the UE's IMSI is used as UE Paging Identity.

The term PID_WO_CTX will be used to mean a privacy-enhancing Paging identifier of a UE used in downlink during PAGING_WO_CTX, i.e., a Paging identifier that enhances the privacy of the UE as compared to existing approaches. There is no PID_WO_CTX in the current LTE, because the clear-text UE_LTID, i.e. IMSI, is reveled over-the-air during PAGING_WO_CTX so as to risk UE privacy. An "encrypted subscription identifier" or a "pseudonym subscription identifier" may be one example of a PID_WO_CTX. Any embodiments described below with regard to PID_WO_CTX may be applied to the paging identifier 18A in FIG. 1, and vice versa.

Finally, the term RESP_PID will be used to mean a privacy-enhancing response identifier of a UE sent in uplink in response to PAGING_WO_CTX. Any embodiments described below with regard to RESP_PID may be applied to the response identifier 22A in FIG. 1, and vice versa.

As discussed above, normally the MME can use the temporary identifier assigned by the MME itself, e.g. S-TMSI, as downlink UE Paging identifier. However, when the MME needs to use the UE_LTID during PAGING_WO_CTX, the clear-text UE_LTID is revealed over-the-air causing privacy issues. A first aspect herein addresses the privacy problem by providing embodiments (methods and apparatuses) in which the network (e.g., MME) sends a PID_WO_CTX (i.e. in the downlink) instead of clear-text UE_LTID in the PAGING_WO_CTX. In this way, the network (e.g. MME in LTE) avoids using clear-text UE_LTID during PAGING_WO_CTX.

More specifically, some embodiments of the first aspect make use of the encrypted UE_LTID transmitted from the UE to the network, by using that encrypted UE_LTID also in the opposite direction for paging. That said, naïve application of encryption operations can result in unacceptable message expansion. Some embodiments therefore allow lossy compression of the encrypted UE_LTID. The compression may be such that the risk of two compressed encrypted UE_LTIDs within the same tracking area being equal is negligible. Therefore, a UE may easily determine whether it is being Paged with a low false-positive rate.

Regardless, an advantage of not using clear-text UE_LTID during downlink PAGING_WO_CTX is that the user privacy is increased. Intercepting a downlink clear-text UE_LTID over-the-air to detect the presence of a certain user associated with a certain UE_LTID in certain area is thwarted.

Moreover, some embodiments herein prove advantageous in that they maintain the current interface between the phone and the Universal Subscriber Identity Module (USIM), and they do not require a re-synchronization procedure to ensure synchronization (e.g., of sequence numbers) between the USIM and HSS.

When the UE responds to the PAGING_WO_CTX, there are privacy implications depending on which identifier the UE sends over-the-air. A second aspect herein addresses these implications by providing embodiments in which the UE sends a RESP_PID (i.e. in the uplink) in response to the PAGING_WO_CTX, preferably different from, and unlikable to, the PID_WO_CTX. In general, therefore, embodiments may provide mechanisms for a mobile device (e.g. a 3GPP UE) to use a different identifier in the uplink attach message (or response message) than the identifier that was used in PAGING_WO_CTX message.

An advantage of not using the same identifier in an uplink message in response to PAGING_WO_CTX is, again, that the user privacy is increased. Correlating the identifiers used in the downlink PAGING_WO_CTX and the uplink response messages to detect the presence of a certain user in certain areas is thwarted.

In some embodiments according to a first aspect, a pseudonym UE_LTID (e.g. pseudonym IMSI) is available in the MME and is used as PID_WO_CTX for PAGING_WO_CTX. The pseudonym UE_LTID may be received from the HSS or from the UE, as indicated by examples in the second aspect below.

In other embodiments, an encrypted UE_LTID is available and is used as PID_WO_CTX for PAGING_WO_CTX. With regard to using an encrypted UE_LTID as PID_WO_CTX, the UE may send the encrypted UE_LTID to the network during the attach procedure, e.g. encrypted IMSI. The MME may not be able to decrypt the encrypted UE_LTID if it was encrypted with the public key of the HSS, but as will be shown that does not matter.

In the case of IMSI, IMSI is constituent of different fields, including a mobile country code (MCC), mobile network code (MNC), and mobile subscription identification number (MSIN), i.e. IMSI=MCC∥MNC∥MSIN. The UE may send to the network the whole IMSI encrypted, i.e. all three parts (MCC, MNC, and MSIN) are encrypted. In such case, the MME should be able to decrypt the IMSI or at least the MCC and MNC parts of the IMSI. Or there should be some extra meta-data that helps the MME to determine the home network of the UE. Alternatively, only the MSIN part may be encrypted by the UE while leaving out the MCC and MNC fields in clear-text, i.e. the UE sends MCC∥MNC∥encrypted MSIN to the network. More generally, an MME should be able to decrypt or obtain at least the parts of the UE_LTID for determining the home network of the UE. The term encrypted UE_LTID herein covers both the techniques mentioned above.

Since the UE sends the encrypted UE_LTID to the MME, irrespective of whether a symmetric or asymmetric encryption scheme is used to encrypt the UE_LTID, both the UE and the MME (i.e. the serving network e.g. MME in LTE) know the value of the encrypted UE_LTID, e.g. encrypted IMSI. The MME may, therefore, in some embodiments use the encrypted UE_LTID (i.e. the one sent by the UE) as the PID_WO_CTX, instead of the clear-text UE_LTID, to perform PAGING_WO_CTX for the UE the next time. Note that the UE already has the value of the encrypted UE_LTID and therefore when the MME uses the encrypted UE_LTID as a downlink UE Paging identifier (i.e. PID_WO_CTX), the UE does not need to perform any decryption. The UE can simply match the downlink identifier (i.e., PID_WO_CTX) with the value the UE already has. Also note that the encrypted UE_LTID is neither any value explicitly assigned by the MME or the HSS to the UE.

A problem associated with using the encrypted UE_LTID as PID_WO_CTX in PAGING_WO_CTX messages is that the total size of the encrypted UE_LTID is generally larger than the clear-text UE_LTID. The size is increased because encryption schemes must prevent the following problem. When two occurrences of the same encrypted UE_LTID are observed in different messages, it will be known to the observer that the values belong to the same UE_LTID that was encrypted. It means that the goal of hiding the relation to the clear-text IMSI will be defeated. Therefore, for any encryption scheme used, the value of encrypted UE_LTID may be different each time the encryption is performed. To such end, the encryption schemes may generally use some kind of techniques (e.g. temporary parameter(s) like nonce(s), random value(s), or ephemeral key(s)) to make the cipher-text (i.e. encrypted UE_LTID) look different each time. The property of having different cipher-text each time is known as a randomization property or probabilistic property. The consequence of using a symmetric or asymmetric encryption scheme with randomization property is that typically the size of the encrypted UE_LTID will be larger than the size of the clear-text UE_LTID. This is because the randomized parameters affecting the encryption need to be made known to the receiver in addition to the cipher text. Note that some encryption schemes by design (irrespective of having randomization property or not) may produce larger encrypted UE_LTID, e.g. symmetric block-ciphers, or some public key encryption schemes. This is for example true for all block oriented encryption schemes, such as Cipher-Block-Chaining of a block cipher or any asymmetric crypto encoding data in finite size elements. Examples of the latter are Rivest-Shamir-Adleman (RSA) or any scheme based on elliptic curves over finite fields.

To better understand the problem of the larger size of encrypted UE_LTID, a more detailed analysis in the concrete situation of a 3GPP network where the UE_LTID is an IMSI may be enlightening. Specifically, it here means that the number of identifiers that can be packed in a single RRC Paging message is reduced. A rough calculation of the maximum size for UE identifiers in an RRC Paging message can be calculated as the following. The S-TMSI is 40 bits. The IMSI is 6-21 INTEGER (0 . . . 9), which equals 24-84 bits in binary-coded decimal (BCD). The size of IMSI is larger than S-TMSI. Therefore, at max. 16 IMSIs can fit in one RRC Paging message. The maximum size for UE identifiers=16×84 bits=1344 bits.

Suppose the encrypted UE_LTID is around 400 bits long (e.g. using Elliptic Curve Integrated Encryption Scheme (ECIES) encryption without a MAC (Message Authentication Code). Then, only 3 encrypted UE_LTIDs can be fit into a single RRC Paging message instead of the normal 16.

The size of the RRC Paging message is also dependent upon the maximum downlink transport block size (TBS). Therefore, for a TBS of 1000 bits, only 2 encrypted UE_LTIDs, each 400 bits long, can be fit in a single RRC Paging message.

The above problem becomes worse when the size of the encrypted UE_LTID becomes larger than the TBS, e.g. more than 2000 bits using RSA encryption. In this case, not even a single encrypted UE_LTID fits into an RRC Paging message.

The problem of the encrypted UE_LTID having a large size is solved in some embodiments by using a compressed version of the encrypted UE_LTID, e.g. only some part of the encrypted UE_LTID value, instead of the full encrypted UE_LTID value, as the downlink identifier, i.e. PID_WO_CTX.

Nevertheless, the issue in using only some part of the encrypted UE_LTID value is that there could be multiple UEs which have a common part (i.e. there could be collision) even though the full encrypted UE_LTID values are unique. Therefore, some embodiments herein select the minimum and sufficient part of the encrypted UE_LTID as the PID_WO_CTX. Selecting the minimum part is important to be size-efficient, and selecting the sufficient part is important to avoid collision.

In some embodiments, it is sufficient that the PID_WO_CTX is unique within the combination of the location/tracking area, the Paging frame (PF), and the Paging Occasion (PO) where the PAGING_WO_CTX message is sent. In other words, the PID_WO_CTX does not need to be globally unique in all the location areas that belong to the MME and in all the PFs/POs. The reason being that even if the downlink PID_WO_CTX used in one area collides with the PID_WO_CTX in another area where the PAGING_WO_CTX message is not sent, then the UE with colliding PID_WO_CTX in the later area does not see the PAGING_WO_CTX message. Similarly, if two or more UEs with colliding PID_WO_CTX in the same area are listening to different POs, then using the PID_WO_CTX in one PO does not create problem to the other because the other UEs will not see the PAGING_WO_CTX message.

Since the MME is responsible for performing PAGING_WO_CTX for the UE, the MME knows the PO and has a mechanism to select the area in which to PAGING_WO_CTX for the UE. Therefore, the MME can determine how much (e.g. how many bits) of encrypted UE_LTID is sufficient to uniquely address the particular UE. In other words, the MME has the opportunity to dynamically adjust the size of the PID_WO_CTX to be sufficiently long to avoid the collision. If there is no collision, then it is possible to use fewer parts (e.g. least significant bits, LSBs, or most significant bits, MSBs) to uniquely address the UE, and if there is collision, then more parts should be used.

To such end, the format of the encrypted UE_LTID may be generalized in some embodiments as the following:

$$\text{Encrypted<UE\_LTID>=Cipher-text}\|[\text{optionalParameters}] \quad (1)$$

In case of some encryption schemes, e.g. RSA, the output of the encryption is a single block of cipher-text. However, in case of other encryption schemes, e.g. ECIES or ElGamal (or some symmetric encryption algorithm with additional parameters such as nonce/initialization vector), there is a cipher-text part and yet another part containing the parameters such as a public value or a key.

The following cases are discussed for selecting the minimum and sufficient part of the encrypted UE_LTID.

Case 1: When the encryption algorithm outputs only the cipher-text. That is, the algorithm does not output any separate additional parameters such as nonces or ephemeral keys to be used by the decryption algorithm. Refer to EQ (1).

When the MME (via eNB) sends the full cipher-text (representing the encrypted UE_LTID that was sent previously to the MME by the UE) in the PAGING_WO_CTX message as a PID_WO_CTX, the risk for collision between two different UE identifiers is negligible. But as discussed, the full cipher-text may be large. Therefore, the MME can send only some number of bits of the said cipher-text, chosen so that these bits would uniquely identify the UE in the set of UEs registered with this MME in this tracking area and the PF/PO. The UE already has the cipher-text (i.e. the encrypted UE_LTID that it previously sent to the MME) and when listening to the PAGING_WO_CTX message the UE only matches the received bits with its value of the cipher-text (i.e. encrypted UE_LTID).

Note that the UE and the MME could be in prior agreement (e.g. standardized or configured) on whether to use the LSBs or the MSBs of the cipher-text (representing the encrypted UE_LTID sent previously to the MME by the UE)

for the operations above. The MME could also dynamically indicate which bits the UE should check, e.g. using a single bit to indicate LSBs or MSBs.

Case 2: When the encryption algorithm outputs the cipher-text and separate additional parameters such as nonces or ephemeral keys to be used by the decryption algorithm. Refer to EQ (1).

When the cipher-text part is separable from other parameters in the encrypted UE_LTID and there is no collision between any pair of the cipher-text parts of the encrypted UE_LTIDs, then the MME can use only the cipher-text part (i.e. without the parameters part even though the parameters are present), as a PID_WO_CTX in the PAGING_WO_CTX message. In case of encryption scheme such as ECIES, the size of the cipher-text is same as the size of the clear-text UE_LTID. Hence, if there is no collision between any pair of the cipher-text parts of the encrypted UE_LTIDs, the full cipher-text part (i.e. without the parameters part even though the parameters are present) could be used without affecting the current maximum number of identifiers that can be sent in a single PAGING_WO_CTX message. The chance of two or more cipher-text parts of the encrypted UE_LTIDs that are used as PID_WO_CTX to collide is very low because, as discussed above, the PID_WO_CTX does not need to be globally unique in all the location/tracking areas that belong to the MME and in all the PFs/POs. In other words, it is sufficient that the PID_WO_CTX is unique within the combination of the location/tracking area, the PF, and the PO where the PAGING_WO_CTX message is sent. However, in rare cases when there is collision, then the MME can include as much of the parameters part (e.g. LSBs or MSBs) as necessary to ensure that the value uniquely identifies the UE in the set of UEs (1) registered with this MME in the tracking area where the PAGING_WO_CTX is done and (2) listening to in the same PF/PO. Also in this case, the UE treats the additionally included bits of the parameters part as representing a piece of the UE's PID_WO_CTX.

Note that the UE may send only the certain fields (e.g. MSIN field) of the UE_LTID in encrypted format while leaving out other fields (such as the MCC and MNC) in clear-text to the MME. In such cases, when the MME later needs to Page the UE using the encrypted UE_LTID, the MME has the additional opportunity to exclude those same fields (e.g. MCC and MNC) when possible, (e.g. to Page non-roaming UEs) in the downlink PID_WO_CTX, if necessary. In doing so, more bits of the cipher-text and the parameters part could be used to avoid collision Further note that the compressed version of encrypted UE_LTID could be applied either only for the UEs whose PID_WO_CTX collide, or to all the UEs for the sake of simplicity. In other words, a paging directed to a plurality of UEs could include a set of PID_WO_CTX, each PID_WO_CTX associated with a distinct UE, wherein the different PID_WO_CTX have either different lengths or the same lengths.

Also, when using an encryption scheme with additional parameters described above, case 2 does not prevent the implementations from treating the combination of cipher-text and parameters as a single blob as in case 1.

Moreover, the MME can let the UE know how many bits of the PID_WO_CTX that the UE should use to "match up" beforehand (e.g. indication in attach accept).

Still further, suppose that the MME does not know whether two encrypted UE_LTIDs in the set of UEs registered in a given tracking area are the same, i.e, they collide. One possibility is then that the MME resorts to using the full encrypted UE_LTID. Another possibility (to avoid increasing the size of the Paging message too much) is that the MME "opportunistically" performs PAGING_WO_CTX using the maximum size allowed in PAGING_WO_CTX message. If there is no collision, only one UE responds and everything works correctly. If there is a collision, then more than one UE will respond.

The MME may determine the PFs/POs itself (e.g. using some network configuration information) or communicate with the radio base station (e.g. eNB) to know the PFs/POs for a given identifier.

The MME may calculate the compressed version of the encrypted UE_LTIDs when PAGING_WO_CTX is to be performed, or already in advance as a preparation to future potential PAGING_WO_CTX.

Consider now some embodiments according to a second aspect for enhancing the privacy of the uplink UE identifier in response to the PAGING_WO_CTX. Irrespective of whether a pseudonym UE_LTID or encrypted UE_LTID (full or partial, with or without parameters) was used by the MME as a PID_WO_CTX, when the UE responds to PAGING_WO_CTX, it may respond and in some embodiments identify itself using some other identifier, e.g., to enhance privacy. Thus, the UE may preferably make use of a RESP_PID in the response to the PAGING_WO_CTX, this RESP_PID being different from the PID_WO_CTX.

In this regard, let ID_A, ID_B, and ID_C symbolically denote different identifiers associated with a single UE. When the identifiers are assigned to the UE (e.g. pseudonym UE_LTID such as pseudonym IMSI), it is assumed that the method to assign different identifiers to the UE (e.g. through encrypted transport from the MME) is implemented in such way that it is infeasible for an outsider (attacker) to link different identifiers together.

There are in total three different event types where identifiers are exposed on the air interface: initial attach (denoted Init), downlink PAGING_WO_CTX (denoted Page) and uplink message in response to PAGING_WO_CTX (denoted Resp). The implications on subscription privacy because of PAGING_WO_CTX are analyzed by taking into consideration the following three cases: (1) Which identifier was used in the uplink, before the user/device was addressed in PAGING_WO_CTX (Earlier message such as initial attach), denoted as Identifier(Init); (2) Which identifier was used in the downlink, at the time of PAGING_WO_CTX (PAGING_WO_CTX message), denoted as Identifier(Page); and (3) Which identifier will be used in the uplink, in response to or after the PAGING_WO_CTX (Later message), denoted as Identifier(Resp).

In the following, Identifier_i is an indexed family of functions from the set of event types {Init, Page, Resp} to the set of identifiers {ID_A, ID_B, ID_C}. The index i runs over the concrete events of the given type; that is, Identifier_3(Init) returns the identifier used by a given UE for the third initial attach event according to some numbering of events. This description abuses notation and drop the index i when only interested in the relations between single events of each type. The Identifier function is used to indicate whether an identifier is used in one or more event types. For example, if the identifier ID_A was used in the PAGING_WO_CTX event, this is written Identifier(Page)= ID_A. The fewer events the same identifier is used in, the better it is privacy wise.

FIG. 13 shows relevant cases where various identifiers used in the different events affect the Privacy.

In case #4, the same identifier UE_LTID (e.g, IMSI) is used in all three messages, e.g., ID_A. This is how Paging in the LTE system works heretofore. The fact Identifier(Init)

is equal to Identifier(Page) reveals that the UE corresponding to the ID_A was in the area. And the fact that Identifier (Page) is equal to Identifier(Resp) reveals again that the UE corresponding to the ID_A is in the area.

Figure 14:
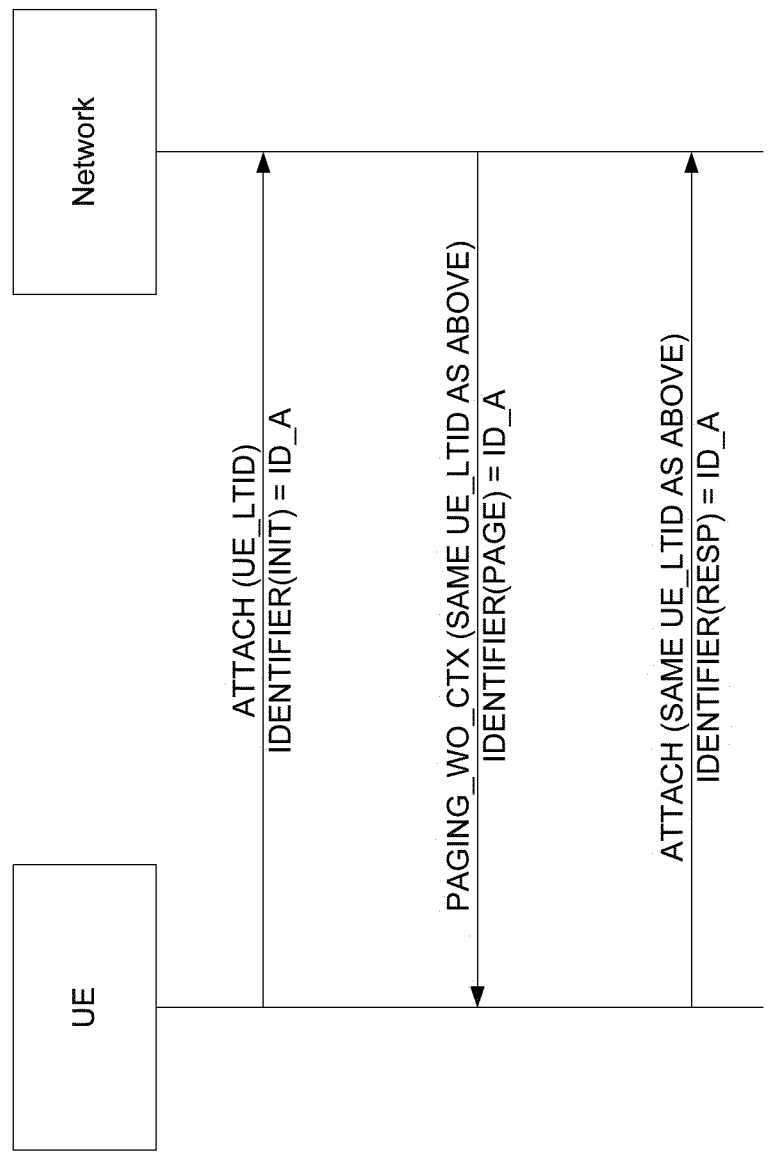
FIG. 14 is a call flow diagram of a paging procedure according to some embodiments.

FIG. 14 illustrates Case #4 in a detailed example. As shown, the UE attaches to the network (e.g., MME) using ID_A as the UE_LTID, i.e., Identifier(Init)=ID_A. Thereafter, the network (e.g., MME) performs PAGING_WO_CTX with respect to the UE using as PID_WO_CTX the same UE_LTID (ID_A) as in the previous step, i.e., Identifier (Page)=ID_A also. In response to the PAGING_WO_CTX in the previous step, the UE again attaches using as RESP_PID the same UE_LTID (ID_A) as in the previous steps, i.e., Identifier(Resp)=ID_A too.

This case is similar to the existing attach procedure using IMSI and IMSI based Paging in LTE. The clear-text IMSI is visible over-the-air and the attacker can know if the UE associated with the observed IMSI was previously or is currently present in the observed area.

Figure 15:
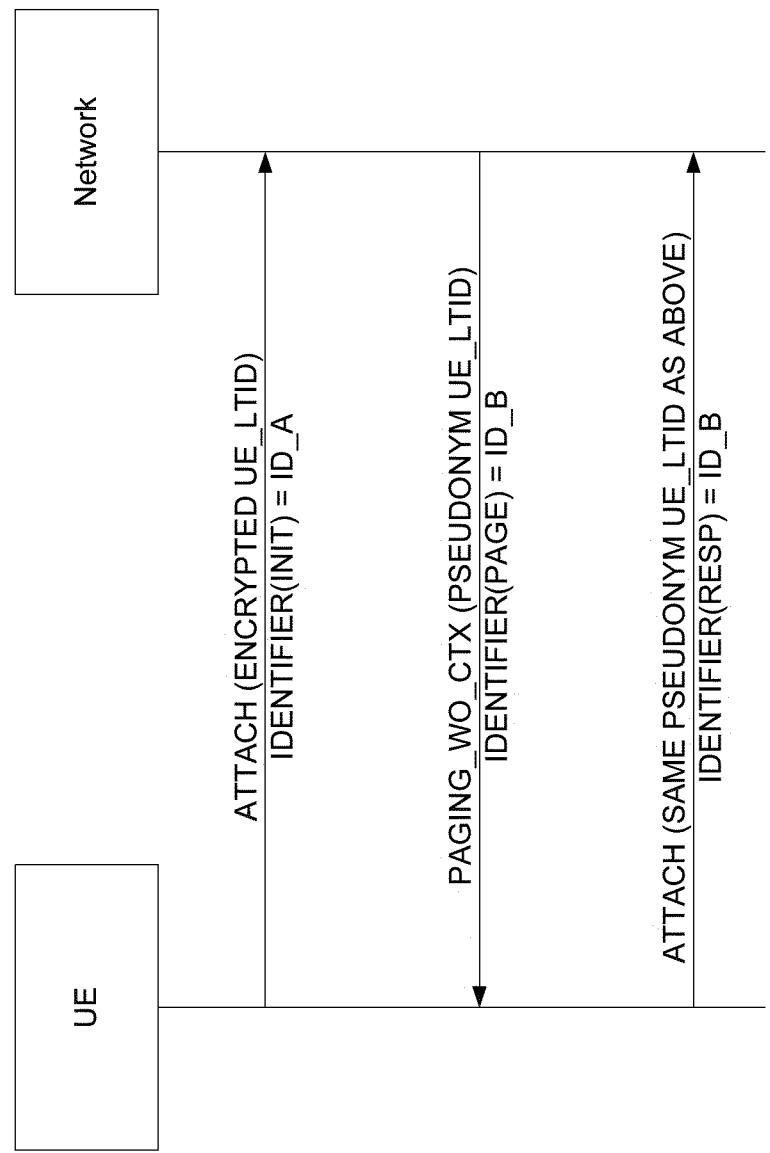
FIG. 15 is a call flow diagram of a paging procedure according to other embodiments.

In case #3, Identifier(Init) is different than the other identifiers used, but Identifier(Page) and Identifier(Resp) are the same (e.g., ID_B). The fact that Identifier(Page) and Identifier(Resp) are both equal to ID_B reveals that the UE corresponding to ID_B is in the area. Case #3 in one example may be used when a combination of encrypted UE_LTID and pseudonym UE_LTID is used as shown in FIG. 15.

The UE sends an encrypted UE_LTID (ID_A) to the MME, i.e., Identifier(Init)=ID_A. Then, a pseudonym UE_LTID (ID_B) is securely shared between the MME and the UE (via explicit assignment or separate calculation). So far, only the ID_A is visible over-the-air and is available to the attacker, but ID_B is not.

Next, the MME performs PAGING_WO_CTX for the UE using as PID_WO_CTX the pseudonym UE_LTID (ID_B) mentioned in the previous step, i.e., Identifier(Page)=ID_B. Now, the ID_B is also visible over-the-air and is available to the attacker. However, the attacker cannot know that the ID_A and the ID_B belong to the same UE.

In response to the PAGING_WO_CTX in the previous step, the UE attaches using as RESP_PID the same pseudonym UE_LTID (ID_B) mentioned in previous steps, i.e., Identifier(Resp)=ID_B. This ID_B used in the PAGING_WO_CTX message is also visible to the attacker. The attacker can know that the same identifier ID_B was used in both the previous step and this step, which reveals that the UE with identifier ID_B is currently present in this area where this PAGING_WO_CTX message is observed.

Notably, Case #1 and Case #s illustrate that the identifier used by the UE in the uplink response message may in some embodiments be a RESP_PID different from the PID_WO_CTX used by the MME in downlink PAGING_WO_CTX messages for said UE and preferably also different from other UE identifiers such as Identifier(Init). Note that the PID_WO_CTX corresponds to Identifier (Page) whereas the RESP_PID corresponds to Identifier (Resp).

Note that, at this point, it is not considered how the identifiers are made known to the UE or the MME. It is assumed both parties are aware of the identifiers and to whom the identifiers are associated.

Note also that when identifiers are said to be "the same" herein it is to be understood that they are based on the same values. For example, as discussed above, Identifier(Page) may need to be truncated to be shorter than Identifier(Init), Still, when Identifier(Page) is a truncation of Identifier(Init) they are considered to be "the same".

In case #2, Identifier(Init) and Identifier(Page) are the same, but Identifier(Resp) is different. This case therefore has better privacy than cases #3 and #4. The fact that Identifier(Init) and Identifier(Page) are the same reveals that the UE corresponding to ID_A was in the area. But the time between usage of Identifier(Init) and Identifier(Page) is larger than between usage of Identifier(Page) and Identifier (Resp). The attacker therefore has to wait longer in order to link Identifier(Init) with Identifier(Page).

Figure 16:
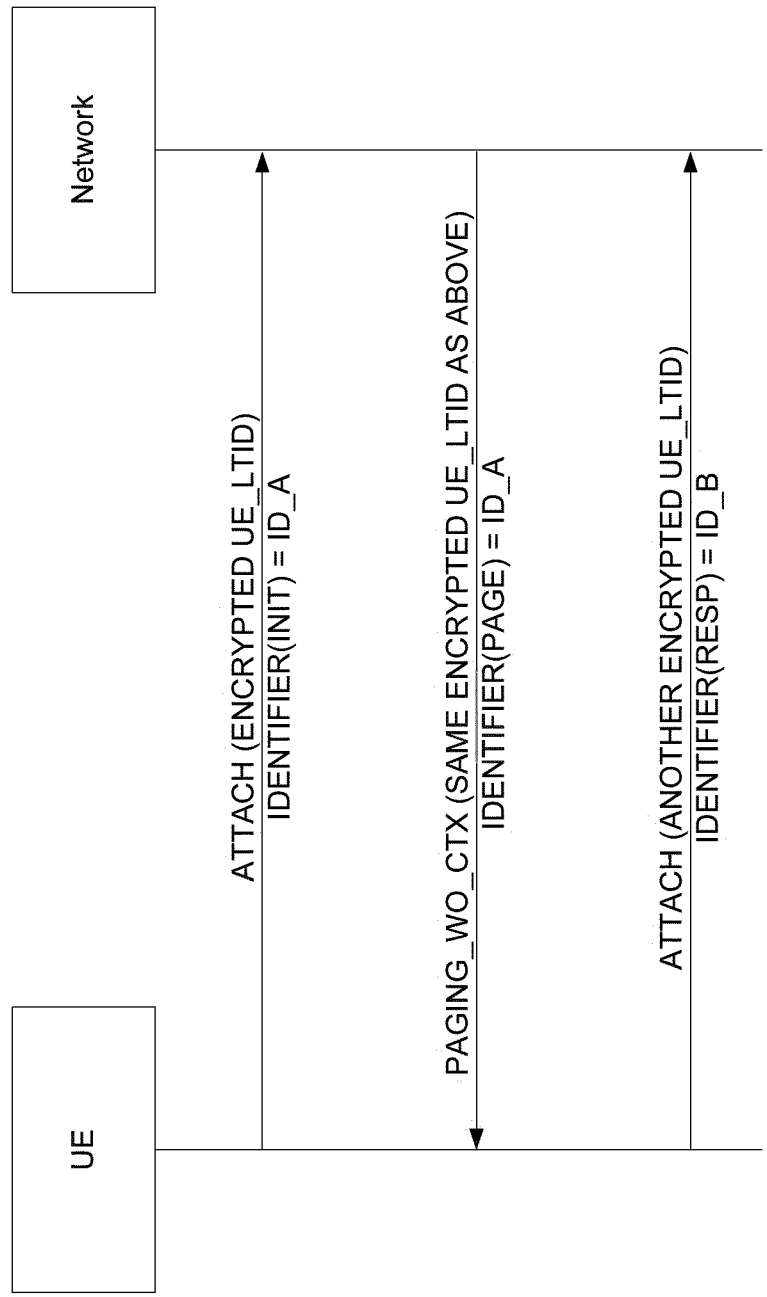
FIG. 16 is a call flow diagram of a paging procedure according to still other embodiments.

As shown in FIG. 16, this case may be used for example when only encrypted UE_LTID(s) are used. The UE sends an encrypted UE_LTID (ID_A) to the MME, i.e., Identifier (Init)=ID_A. The MME remembers this encrypted UE_LTID (ID_A) to be associated with the UE. The ID_A is visible over-the-air and is available to the attacker.

The MME then performs PAGING_WO_CTX for the UE using as PID_WO_CTX the encrypted UE_LTID from the previous step, i.e. Identifier(Page)=ID_A. This ID_A used in the PAGING_WO_CTX message is also visible to the attacker. The attacker can know that the same identifier ID_A was used in both the previous and this step, which reveals that the UE with identifier ID_A was previously present in this area where this PAGING_WO_CTX message is observed.

In response to the PAGING_WO_CTX in the previous step, the UE attaches using as RESP_PID a new encrypted UE_LTID (ID_B), i.e., Identifier(Resp)=ID_B. The ID_B is visible over-the-air and is available to the attacker. Even though, in the previous step, it was revealed that the UE with identifier ID_A was in the observed area, the attacker cannot know if the same UE is still in the same area or not, because the attacker cannot know that the ID_A and the ID_B belong to the same UE.

In case #1, Identifier(Init), Identifier(Page), Identifier (Resp) are all different. Because of this, an attacker learns nothing about the subscriber's identity. This case may be used in various scenarios, some of which are discussed below.

Figure 17:
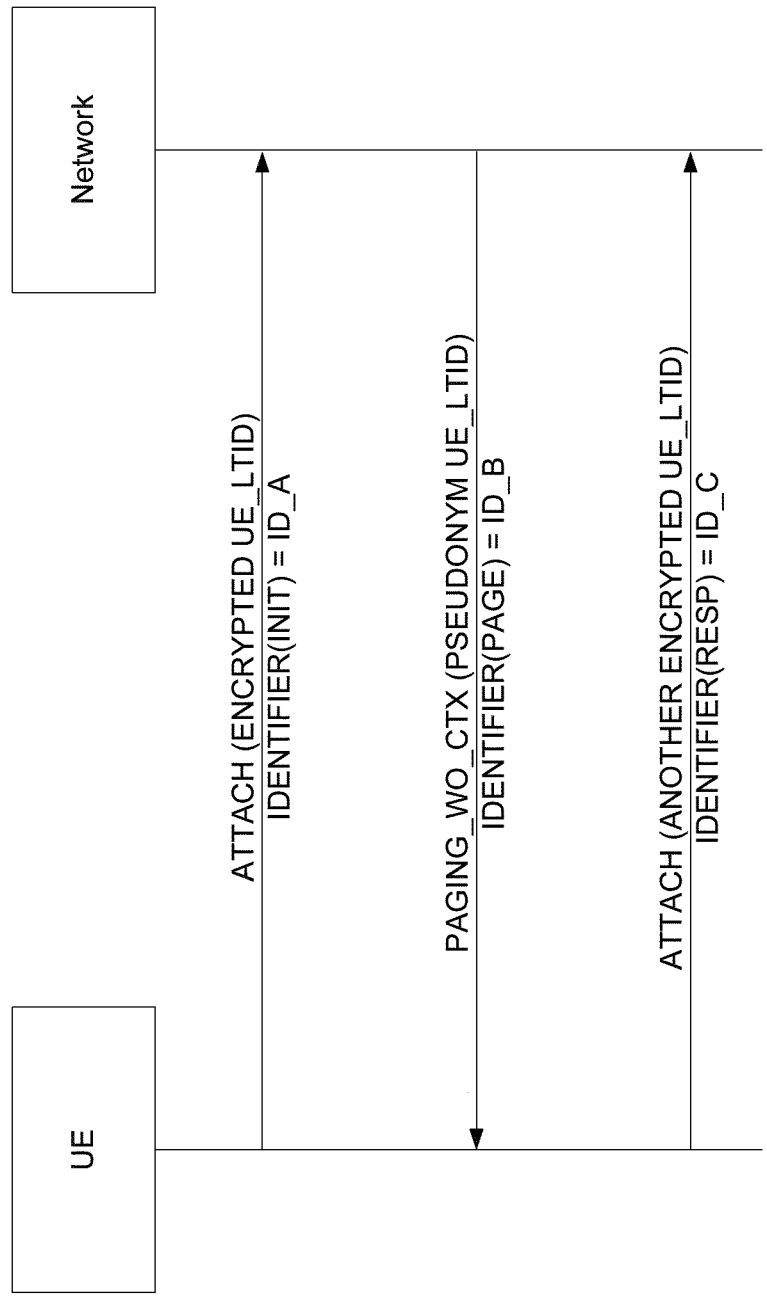
FIG. 17 is a call flow diagram of a paging procedure according to yet other embodiments.

As shown in FIG. 17, for example, a first scenario is when a combination of encrypted UE_LTID (e.g. IMSI) and pseudonym UE_LTID (e.g. pseudonym IMSI) is used. In this case, the UE sends an encrypted UE_LTID (ID_A) to the MME, i.e., Identifier(Init)=ID_A. Then, a pseudonym UE_LTID (ID_B) is securely shared between the MME and the UE (via explicit assignment or separate calculation). So far, only the ID_A is visible over-the-air and is available to the attacker, but ID_B is not.

The MME then performs PAGING_WO_CTX for the UE using as PID_WO_CTX, the pseudonym IMSI (ID_B), mentioned in the previous step, i.e., Identifier(Page)=ID_B. Now, the ID_B is also visible over-the-air and is available to the attacker. However, the attacker cannot know that the ID_A and the ID_B belong to the same UE.

In response to the PAGING_WO_CTX in the previous step, the UE attaches using as RESP_PID, a new encrypted UE_LTID (ID_C), i.e., Identifier(Resp)=ID_C. Now, the ID_C is also visible over-the-air and is available to the attacker. However, the attacker cannot know the ID_A, ID_B, and ID_C belong to the same UE.

Figure 18:
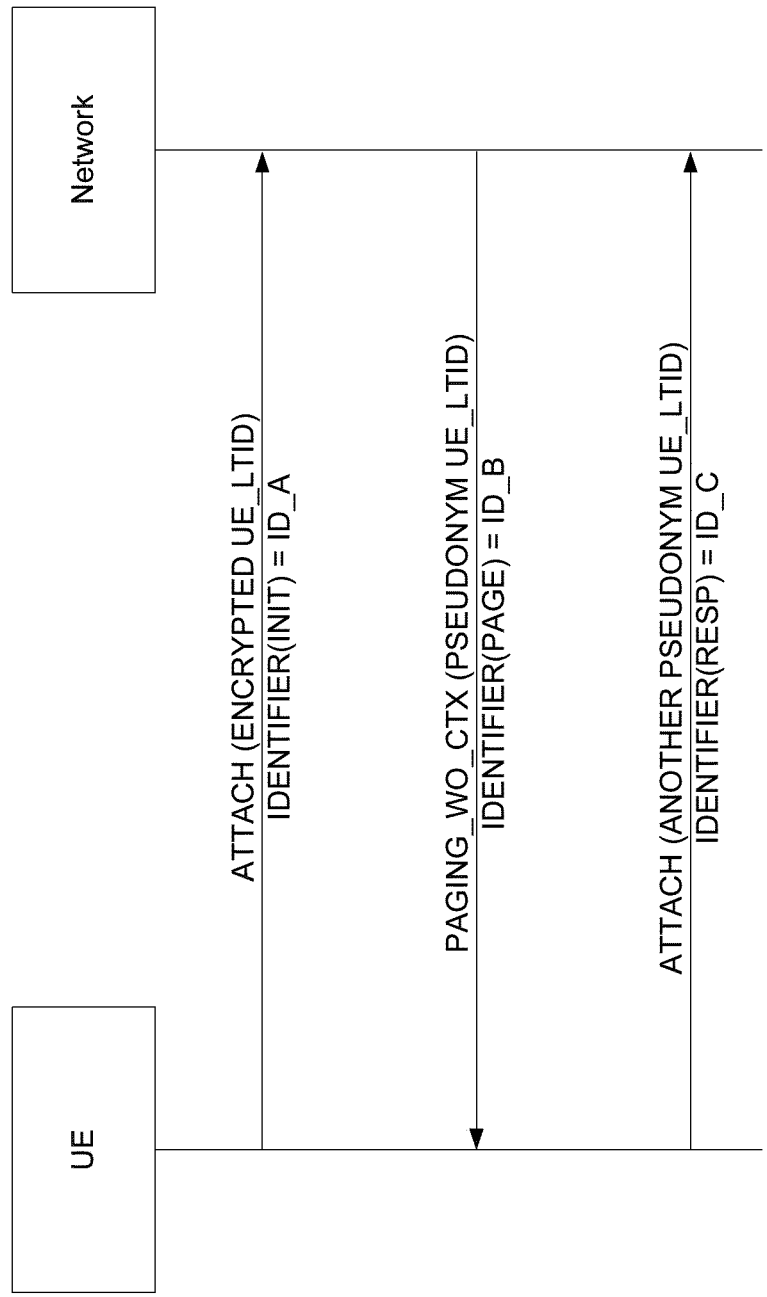
FIG. 18 is a call flow diagram of a paging procedure according to still other embodiments.

As shown in FIG. 18, a second scenario is when a combination of encrypted UE_LTID and multiple pseudonym UE_LTIDs are used. The UE sends an encrypted UE_LTID (ID_A) to the MME, i.e., Identifier(Init)=ID_A. Then, at least two pseudonym UE_LTIDs, say ID_B and ID_C are securely shared between the MME and the UE. So far, only the ID_A is visible over-the-air and is available to the attacker, but ID_B and ID_C are not.

Then, the MME performs PAGING_WO_CTX for the UE using as PID_WO_CTX one of the pseudonym UE_LTID in the previous step (say ID_B), i.e., Identifier(Page)=ID_B. Now, the ID_B is also visible over-the-air and is available to the attacker. However, the attacker cannot know that the ID_A and the ID_B belong to the same UE. The ID_C is still unknown to the attacker.

In response to the PAGING_WO_CTX in the previous step, the UE attaches using as RESP_PID the different pseudonym UE_LTID (i.e. ID_C), i.e., Identifier(Resp)=ID_C. Now, the ID_C is also visible over-the-air and is available to the attacker. However, the attacker cannot know the ID_A, ID_B, and ID_C belong to the same UE.

Figure 19:
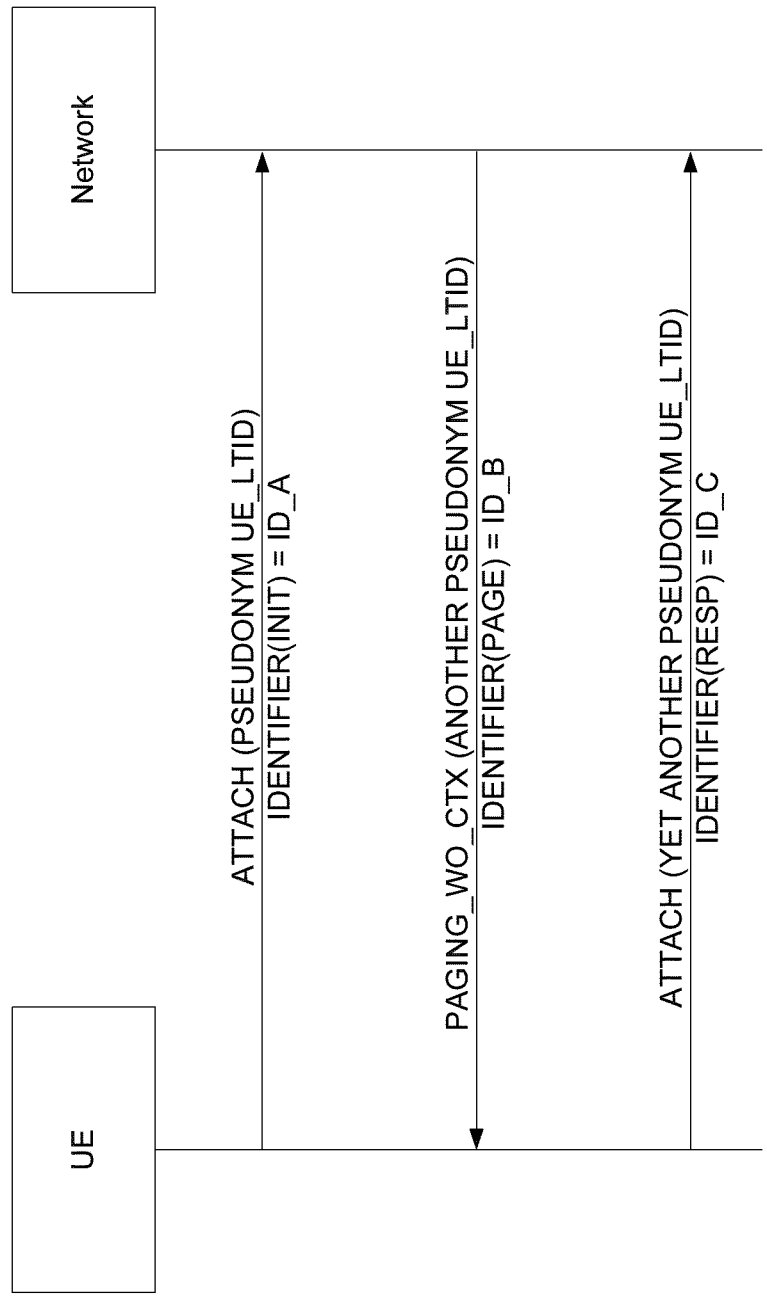
FIG. 19 is a call flow diagram of a paging procedure according to yet other embodiments.

FIG. 19 shows a third scenario when only pseudonym UE_LTIDs are used, i.e. encrypted UE_LTID is not used and multiple pseudonym UE_LTIDs are used. In this case, the UE sends a pseudonym UE_LTID (ID_A) to the MME, i.e., Identifier(Init)=ID_A. Then, at least two new pseudonym UE_LTIDs, say ID_B and ID_C are securely shared between the MME and the UE. So far, only the ID_A is visible over-the-air and is available to the attacker, but ID_B and ID_C are not.

The MME then performs PAGING_WO_CTX for the UE using as PID_WO_CTX one of the new pseudonym UE_LTIDs in the previous step (say ID_B), i.e., Identifier(Page)=ID_B. Now, the ID_B is also visible over-the-air and is available to the attacker. However, the attacker cannot know that the ID_A and the ID_B belong to the same UE. The ID_C is still unknown to the attacker.

In response to the PAGING_WO_CTX in the previous step, the UE attaches using as RESP_PID the different pseudonym UE_LTID (i.e. ID_C), i.e., Identifier(Resp)=ID_C. Now, the ID_C is also visible over-the-air and is available to the attacker. However, the attacker cannot know the ID_A, ID_B, and ID_C belong to the same UE.

Note that in all of the above cases, during or after the authentication procedure, once the MME knows the UE_LTID of the UE, the MME can determine that the UE, which was addressed in PAGING_WO_CTX, did respond.

Note that the pseudonym IMSI (i.e. pseudonym UE_LTID) is not assigned by the serving-network (c.f. MME), unlike the S-TMSI.

In some embodiments, the UE Identity Index that is used for determining the PF and PO may be calculated as: UE Identity Index=IMSI mod 1024. Note however that the S-TMSI may be used instead of IMSI in determining the UE Identity Index. Moreover, the PAGING_WO_CTX may be a scenario when other identifiers (e.g. S-TMSI) are not available. So, the UE Identity Index may instead be calculated based on pseudonym UE_LTID, encrypted UE_LTID, or a compressed version of encrypted UE_LTID (e.g. parts of encrypted UE_LTID like encrypted MSIN). Doing so increases the user privacy, because the UE_LTID group is not revealed by when the PAGING_WO_CTX message is seen over the air.

In both the S1 (or S1-like) and RRC (or RRC-like) Paging message, new types of identity may be added. For example, a dynamic identity may represent PID_WO_CTX, as:

```
PagingUE-Identity ::=       CHOICE {
    s-TMSI                      S-TMSI,  //EXISTING
    imsi                        IMSI,    //EXISTING
    dynamic-id                  DYNAMIC-ID
}
```

For the sake of example, the format of the DYNAMIC-ID may be BIT STRING or SEQUENCE of INTEGER or type-length-value (TLV), depending upon what fits with any specific implementation.

When the UE loses encrypted UE_LTID or pseudonym UE_LTID, the MME cannot perform PAGING_WO_CTX for the UE. Note that losing encrypted UE_LTID or pseudonym UE_LTID is a worst case scenario, i.e. rare, and the recovery may depend upon the UE itself re-attaching to the network.

A variation of the above scheme for the first aspect is the following.

Referring to EQ(1), in addition to the cipher-text, e.g. as a part of or in addition to the optional parameters, the UE may also include encrypting-information which can be used to establish a key between the UE and the MME for encrypting messages to be later sent in conjunction with the PAGING_WO_CTX. This encryption-information will be referred to as UE encryption information henceforth. It can comprise, e.g., a first ephemeral public key to which the UE has or can calculate the corresponding private key. It could also be a static public key associated with the UE, and/or freshness parameters such as nonces. When the MME receives the UE encryption information, the MME has sufficient information to encrypt data to be sent to the UE.

The MME can send MME encryption information to the UE in a protected attach accept message in response to the previously received attach request. This information includes parameters that will enable the UE to decrypt broadcast messages, e.g. PAGING_WO_CTX, from the network. Preferably, the information contains a second ephemeral key which is freshly generated by the MME. Upon receipt of the MME encryption information, the UE can combine it with its UE encryption information to form a key SK. Similarly, the MME forms the key SK or a key related to the SK, i.e. SK'. The keys SK and SK' may be equal and they are then referred to as a symmetric key. Alternatively, the UE and the MME may make use of a more or less static public key, e.g. an RSA key, of the MME comprised in the MME encryption information to establish the symmetric key.

In case the MME is required to perform a PAGING_WO_CTX, the MME can now use the symmetric key to encrypt or hash the UE_LTID and use the encrypted or hashed UE_LTID as the PID_WO_CTX. This encryption or hash can be done before the MME is aware that it is required to perform the PAGING_WO_CTX, in which case the MME can delete the symmetric key afterwards. The MME can then compress/truncate the encrypted or hashed UE_LTID as described in previous sections, before transmitting it for the purpose of PAGING_WO_CTX.

The UE can also encrypt or hash its UE_LTID using the symmetric key as soon as the symmetric key is derived. The UE then knows which PID_WO_CTX will be used by the MME for PAGING_WO_CTX and the UE will inspect PAGING_WO_CTX messages for that encrypted or hashed UE_LTID as described in previous sections. The UE may need to be prepared to match against different lengths of the PID_WO_CTX since the UE does not know how many bits of PID_WO_CTX the MME needs to transmit to avoid colliding PID_WO_CTXs. If the UE detects (parts of) its encrypted or hashed UE_LTID in a PAGING_WO_CTX message, it responds by connecting to the network.

In some embodiments, the key SK is constructed as follows. The UE includes an ElGamal public key in the UE encryption information. The MME includes the ElGamal encryption of SK to the UE in the MME encryption information.

Note that the MME may include the MME encryption information only in the PAGING_WO_CTX message. This may however increase the size of PAGING_WO_CTX, which may be unacceptable under some circumstances.

In view of the above modifications and variations, embodiments herein generally include a privacy-enhanced method performed by an MME to send a PAGING_WO_CTX to a UE using a privacy-enhancing paging identifier. The method comprises determining the privacy-enhancing paging identifier of the target UE, including at least part of the privacy-enhancing paging identifier in the PAGING_WO_CTX message, and sending the PAGING_WO_CTX message intendent to the UE. The method may be characterized in that the privacy-enhancing paging identifier is based on an encrypted UE_LTID sent by the UE to the network in a previous message, e.g. initial attach request message. In some embodiments, the method also comprises calculating a UE Identity Index based on the privacy-enhancing paging identifier.

Embodiments also include a privacy-enhanced method performed by a UE to respond to a PAGING_WO_CTX sent by an MME, the PAGING_WO_CTX comprising of a identifying the privacy-enhancing paging identifier of the target UE. The method comprises determining the privacy-enhancing paging identifier of the UE, receiving the PAGING_WO_CTX from the MME, determining if the UE's privacy-enhancing paging identifier was used in PAGING_WO_CTX, and responding with the UE's RESP_PID. The method may be characterized in that the privacy-enhancing paging identifier is based on an encrypted UE_LTID sent by the UE to the network in a previous message, e.g. initial attach request message. And, that the RESP_PID is different from the privacy-enhancing paging identifier. In some embodiments, the method also comprises calculating the UE Identity Index (or PF and PO if that matters) based on the UE's privacy-enhancing paging identifier.

Embodiments further include a method of paging a mobile device (e.g., UE or ME in LTE) identified by an identifier. The method is performed in a network node (e.g., MME) of a communication system. The method comprises determining a first key establishment information, concealing the identifier using a key derivable from the first key establishment information, and transmitting the concealed identifier and a second key establishment information.

In some embodiments, the method further comprises compressing the concealed identifier before transmitting it.

In one embodiment, for example, the method may further comprise determining whether the compressed concealed identifier is equal to a second compressed concealed identifier associated with a second mobile device, and if the determining concludes that two or more mobile devices are associated with equal compressed concealed identifiers, redoing the compressing with a less efficient compression rate and repeating the determining.

Alternatively or additionally, the compressing may comprise truncating the concealed identifier.

In any of these embodiments, the first and the second key establishment information may be the same.

In any of these embodiments, the second key establishment information may be related to the first key establishment information.

In any of these embodiments, the second key establishment information may be a subset of the first key establishment information.

In any of these embodiments, the second key establishment information may be empty (i.e., nothing is sent).

In any of these embodiments, the key may be derivable from the second key establishment information.

In any of these embodiments, the concealing may be encryption.

Embodiments herein also include a method performed by a wireless device for receiving a page initiated by a network node, e.g., that lacks a security context for the wireless device. The method may comprise encrypting a subscription identifier for the wireless device to obtain an encrypted subscription identifier. The method may also comprise transmitting the encrypted subscription identifier to the network node. The method may further comprise receiving a page that is initiated by the network node and that includes a paging identifier. The method may also comprise responding to or ignoring the page depending on whether the paging identifier is based on the encrypted subscription identifier.

In some embodiments, the method may comprise determining whether the paging identifier matches the encrypted subscription identifier, at least in part, and responding to or ignoring the page depending on whether the paging identifier matches the encrypted subscription identifier according to the determining. In one embodiments, for example, said determining comprises determining whether the paging identifier matches the encrypted subscription identifier, at least in part, without decrypting (or attempting to decrypt) the paging identifier.

In any of these embodiments, the method may comprise attempting to match the paging identifier against different portions of the encrypted subscription identifier, wherein the different portions have different lengths.

In some embodiments, the paging identifier is the encrypted subscription identifier. In other embodiments, the paging identifier is a part of the encrypted subscription identifier. In still other embodiments, the paging identifier is a transformation of the encrypted subscription identifier. For example, the paging identifier may be a hashed or compressed version of the encrypted subscription identifier.

In some embodiments, the method further comprises encrypting or hashing the subscription identifier based on privacy information indicated by the encrypted subscription identifier, to obtain a privacy subscription identifier, and responding to or ignoring the page depending on whether the paging identifier matches the privacy subscription identifier, at least in part. In one embodiment, for example, such encrypting or hashing comprises encrypting or hashing the subscription identifier, to obtain the privacy subscription identifier, also based on privacy information received by the wireless device from the network node. This privacy information may be received from the network node, for example, within an attach accept message in response to an attach request message from the wireless device.

In any of these embodiments, the method may comprise transmitting the encrypted subscription identifier to the network node during a network attachment procedure or an authentication procedure.

In any of these embodiments, the method may comprise transmitting the encrypted subscription identifier to the network node within an attach request message or an identity response message.

In any of the embodiments, the method may comprise transmitting the encrypted subscription identifier to the network node during, or as part of establishing, a security context at the network node for the wireless device, and receiving the page with the paging identifier after the security context is lost at the network node.

In some embodiments, the method comprises receiving the page with the paging identifier when the network node lacks a temporary subscription identifier assigned by the network node to the wireless device.

In some embodiments, the encrypted subscription identifier is larger in size than the subscription identifier.

In some embodiments, the method comprises encrypting the subscription identifier, at least in part, with a key associated with the wireless device's home network. For example, in one embodiment, the key is a public key associated with the wireless device's home network, such that the encrypted subscription identifier is decryptable with a private key paired with the public key.

In some embodiments, the network node is a node in the wireless device's serving network.

In some embodiments, the encrypted subscription identifier is an encrypted international mobile subscriber number.

Embodiments herein also include a method performed by a network node for initiating paging of a wireless device, e.g., for which the network node lacks a security context. The method comprises receiving an encrypted subscription identifier from the wireless device. The method also comprises initiating paging of the wireless device with a paging identifier that is based on the encrypted subscription identifier.

In some embodiments, the method comprises receiving the encrypted subscription identifier from the wireless device during a network attachment procedure or an authentication procedure.

In some embodiments, the method comprises receiving the encrypted subscription identifier from the wireless device within an attach request message or an identity response message.

In some embodiments, the method comprises receiving the encrypted subscription identifier from the wireless device during, or as part of establishing, a security context at the network node for the wireless device, and initiating paging of the wireless device with the paging identifier after losing the security context at the network node.

In some embodiments, the method comprises initiating paging of the wireless device with the paging identifier when the network node lacks a temporary subscription identifier assigned by the network node to the wireless device.

In some embodiments, the encrypted subscription identifier is a subscription identifier encrypted by the wireless device.

In some embodiments, the encrypted subscription identifier is larger in size than a decrypted version of the encrypted subscription identifier.

In some embodiments, the encrypted subscription identifier is a subscription identifier encrypted, at least in part, with a key associated with the wireless device's home network. In one embodiments, for example, the key is a public key associated with the wireless device's home network, such that the encrypted subscription identifier is decryptable with a private key paired with the public key.

In some embodiments, the network node determines the paging identifier based on the encrypted subscription identifier without decrypting the encrypted subscription identifier.

In some embodiments, the method further comprises determining the paging identifier to be unique from one or more other paging identifiers with which the network node is to page one or more other wireless devices. Alternatively or additionally, the method in some embodiments further comprises determining the paging identifier to be unique from one or more other paging identifiers with which the network node is to page one or more other wireless devices at substantially the same time as the network node is to page the wireless device.

In one embodiment, for example, determining the paging identifier comprises dynamically determining a length of the paging identifier to be as long as needed to avoid collision with the one or more other paging identifiers. Alternatively or additionally, the encrypted subscription identifier in some embodiments comprises a cipher-text, and determining the paging identifier comprises dynamically determining a length of the cipher-text on which to base the paging identifier. Alternatively or additionally, the encrypted subscription identifier in some embodiments comprises a cipher-text and one or more clear-text parameters, and determining the paging identifier comprises dynamically determining a length of, or how many of, the one or more clear-text parameters on which to base the paging identifier.

In some embodiments, determining the paging identifier comprises compressing the paging identifier to the extent possible while avoiding collision with the one or more other paging identifiers.

In some embodiments, the network node is a node in the wireless device's serving network.

In some embodiments, the paging identifier is the encrypted subscription identifier.

In some embodiments, the paging identifier is a part of the encrypted subscription identifier.

In some embodiments, the paging identifier is a dynamically determined part of the encrypted subscription identifier.

In some embodiments, the paging identifier is a transformation of the encrypted subscription identifier. For example, in some embodiments, the paging identifier is a hashed or compressed version of the encrypted subscription identifier.

In some embodiments, the method further comprises calculating the paging identifier based on the encrypted subscription identifier. In one embodiment, for example, the method comprises calculating the paging identifier by encrypting or hashing a subscription identity based on privacy information indicated by the encrypted subscription identifier. In some embodiments, this encrypting or hashing comprises encrypting or hashing the subscription identity also based on privacy information transmitted from the network node to the wireless device.

In some embodiments, the method further comprises transmitting the privacy information to the wireless device within an attach accept message in response to an attach request message from the wireless device.

In some embodiments, the encrypted subscription identifier is an encrypted international mobile subscriber number.

Embodiments also include corresponding apparatus, computer programs, and carriers. For example, embodiments include a wireless device configured for receiving a page initiated by a network node, e.g., that lacks a security context for the wireless device. The wireless device is configured to encrypt a subscription identifier for the wireless device to obtain an encrypted subscription identifier, transmit the encrypted subscription identifier to the network node, receive a page that is initiated by the network node and that includes a paging identifier, and respond to or ignore the page depending on whether the paging identifier is based on the encrypted subscription identifier.

Embodiments further include a network node configured for initiating paging of a wireless device, e.g., for which the network node lacks a security context. The network node is configured to receive an encrypted subscription identifier from the wireless device, and initiate paging of the wireless device with a paging identifier that is based on the encrypted subscription identifier.

Embodiments herein also include a method performed by a wireless device. The method comprises receiving from a network node a page that includes a paging identifier for the wireless device. The paging identifier may identify as a target of the page a wireless device associated with a particular subscriber. In fact, in some embodiments, the paging identifier is based on an encrypted subscription identifier for the wireless device or is a pseudonym subscription identifier for the wireless device. In any event, the method further comprises transmitting to the network node a response to the page that indicates the wireless device was paged but that includes an identifier for the wireless device that is different than the paging identifier included in the page.

In some embodiments, the response includes an identifier that is based on an encrypted subscription identifier, the page is initiated by a network node, and the method further comprises transmitting the encrypted subscription identifier from the wireless device to the network node prior to receiving the page. In other embodiments, the response includes an identifier that is based on an encrypted subscription identifier, the page is initiated by a network node, and the method further comprises transmitting a different encrypted subscription identifier from the wireless device to the network node prior to receiving the page.

In some embodiments, the page is initiated by the network node, and the method further comprises determining whether to respond to or ignore the page depending on whether the paging identifier is based on the pseudonym subscription identifier for the wireless device, wherein the pseudonym subscription identifier is associated with the wireless device's home network. In one embodiment, for example, the method further comprises transmitting the pseudonym subscription identifier to the network node. This may involve for instance transmitting the pseudonym subscription identifier to the network node during an attachment procedure or an authentication procedure.

Embodiments herein also include a method performed by a network node. The method comprises initiating transmission of a page to a wireless device that includes a paging identifier for the wireless device. The paging identifier may identify as a target of the page a wireless device associated with a particular subscriber. In fact, in some embodiments, the paging identifier is based on an encrypted subscription identifier for the wireless device or is a pseudonym subscription identifier for the wireless device. Regardless, the method also comprises receiving a response to the page that indicates the wireless device was paged but that includes an identifier for the wireless device that is different than the paging identifier included in the page.

In some embodiments, the response includes an identifier that is based on an encrypted subscription identifier, and the method further comprises receiving the encrypted subscription identifier from the wireless device prior to receiving the page. In other embodiments, the response includes an identifier that is based on an encrypted subscription identifier, and the method further comprises receiving a different encrypted subscription identifier from the wireless device prior to receiving the page.

In some embodiments, the paging identifier is based on the pseudonym subscription identifier, and the method further comprises receiving the pseudonym subscription identifier, wherein the pseudonym subscription identifier is associated with the wireless device's home network. For example, in one embodiment, the method comprises receiving the pseudonym subscription identifier from the wireless device, e.g., during an attachment procedure or an authentication procedure. In other embodiments, the method comprises receiving the pseudonym subscription identifier from the wireless device's home network.

In any of the embodiments for the method performed by the wireless device or the network node, the page is initiated by a network node, and the paging identifier is based on an encrypted subscription identifier that the wireless device transmitted to the network node prior to receiving the page. In one embodiment, for example, the paging identifier is the encrypted subscription identifier. In another embodiment, the paging identifier is a part of the encrypted subscription identifier. In still another embodiment, the paging identifier is a transformation of the encrypted subscription identifier. For example, the paging identifier may be a hashed or compressed version of the encrypted subscription identifier. In any of these embodiments, the encrypted subscription identifier may be encrypted, at least in part, with a key associated with the wireless device's home network. In any of these embodiments, the response may include a different encrypted subscription identifier for the wireless device. In other embodiments, the response includes a pseudonym subscription identifier for the wireless device that is different than the paging identifier and that is associated with the wireless device's home network.

In other embodiments for the method performed by the wireless device or the network node, the paging identifier is a pseudonym subscription identifier for the wireless device. The pseudonym subscription identifier may be associated with the wireless device's home network. In one such embodiment, the response includes a different pseudonym subscription identifier for the wireless device that is associated with the wireless device's home network. In another embodiment, though, the response includes an identifier that is based on an encrypted subscription identifier. In one embodiment, for example, the paging identifier is the encrypted subscription identifier. In another embodiment, the paging identifier is a part of the encrypted subscription identifier. In still another embodiment, the paging identifier is a transformation of the encrypted subscription identifier. For example, the paging identifier may be a hashed or compressed version of the encrypted subscription identifier. In any of these embodiments, the encrypted subscription identifier may be encrypted, at least in part, with a key associated with the wireless device's home network.

Embodiments also include corresponding apparatus, computer programs, and carriers. For example, embodiments include a wireless device configured to receive from a network node a page that includes a paging identifier for the wireless device. The paging identifier may identify as a target of the page a wireless device associated with a particular subscriber. In fact, in some embodiments, the paging identifier is based on an encrypted subscription identifier for the wireless device or is a pseudonym subscription identifier for the wireless device. In any event, the wireless device is also configured to transmit to the network node a response to the page that indicates the wireless device was paged but that includes an identifier for the wireless device that is different than the paging identifier included in the page.

Embodiments further include a network node. The network node is configured to initiate transmission of a page to a wireless device that includes a paging identifier for the wireless device. The paging identifier may identify as a target of the page a wireless device associated with a particular subscriber. In fact, in some embodiments, the paging identifier is based on an encrypted subscription identifier for the wireless device or is a pseudonym subscription identifier for the wireless device. Regardless, the network node is also configured to receive a response to the page that indicates the wireless device was paged but that includes an identifier for the wireless device that is different than the paging identifier included in the page.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a wireless device, the method comprising:
   receiving, from a network node, a page that includes a paging identifier for the wireless device, wherein the paging identifier either is based on an encrypted subscription identifier for the wireless device or is a pseudonym subscription identifier for the wireless device and the page is initiated by the network node;
   transmitting, to the network node, a response to the page that indicates the wireless device was paged, the response including an identifier for the wireless device that is different than the paging identifier included in the page, and that is based on the encrypted subscription identifier; and
   transmitting an encrypted subscription identifier from the wireless device to the network node prior to receiving the page.

2. The method of claim 1: further comprising transmitting a different encrypted subscription identifier from the wireless device to the network node prior to receiving the page.

3. The method of claim 1:
   wherein the page is initiated by the network node; and
   further comprising determining whether to respond to or ignore the page depending on whether the paging identifier is based on the pseudonym subscription identifier for the wireless device, wherein the pseudonym subscription identifier is associated with the wireless device's home network.

4. The method of claim 3, further comprising transmitting the pseudonym subscription identifier to the network node.

5. A method performed by a network node, the method comprising:
   initiating transmission of a page to a wireless device that includes a paging identifier for the wireless device, wherein the paging identifier either is based on an encrypted subscription identifier for the wireless device or is a pseudonym subscription identifier for the wireless device;
   receiving a response to the page that indicates the wireless device was paged but that includes an identifier for the wireless device that is different than the paging identifier included in the page, wherein the identifier is based on the encrypted subscription identifier; and
   receiving the encrypted subscription identifier from the wireless device prior to initiating the transmission of the page to the wireless device.

6. The method of claim 5: further comprising receiving a different encrypted subscription identifier from the wireless device prior to receiving the page.

7. The method of claim 5:
   wherein the paging identifier is based on the pseudonym subscription identifier; and
   further comprising receiving the pseudonym subscription identifier, wherein the pseudonym subscription identifier is associated with the wireless device's home network.

8. The method of claim 1: wherein the page is initiated by the network node; and wherein the paging identifier is based on the encrypted subscription identifier that the wireless device transmitted to the network node prior to receiving the page.

9. The method of claim 8, wherein the paging identifier is either the encrypted subscription identifier, a part of the encrypted subscription identifier, or a transformation of the encrypted subscription identifier.

10. The method of claim 8, wherein the encrypted subscription identifier is encrypted, at least in part, with a key associated with the wireless device's home network.

11. The method of claim 8, wherein the response includes a different encrypted subscription identifier for the wireless device.

12. The method of claim 1, wherein the paging identifier is a pseudonym subscription identifier for the wireless device that is associated with the wireless device's home network.

13. The method of claim 12, wherein the response includes a different pseudonym subscription identifier for the wireless device that is associated with the wireless device's home network.

14. The method of claim 12, wherein the response includes the identifier that is based on the encrypted subscription identifier.

15. A wireless device, comprising:
   processing circuitry; and
   memory containing instructions executable by the processing circuitry whereby the wireless device is operative to:
      receive a page that includes a paging identifier for the wireless device, wherein the paging identifier either is based on an encrypted subscription identifier for the wireless device or is a pseudonym subscription identifier for the wireless device, and the page is initiated by the network node;
      transmit a response to the page that indicates the wireless device was paged, the response including an identifier for the wireless device that is different than the paging identifier included in the page, and that is based on the encrypted subscription identifier; and
      receiving an encrypted subscription identifier from the wireless device prior to receiving the page.

16. A network node, comprising:
   processing circuitry; and
   memory containing instructions executable by the processing circuitry whereby the network node is operative to:
      initiate transmission of a page to a wireless device that includes a paging identifier for the wireless device, wherein the paging identifier either is based on an encrypted subscription identifier for the wireless device or is a pseudonym subscription identifier for the wireless device;
      receive a response to the page that indicates the wireless device was paged but that includes an identifier for the wireless device that is different than the paging identifier included in the page, and that is based on an encrypted subscription identifier; and receive the encrypted subscription identifier from the wireless device prior to the initiated transmission of the page.

\* \* \* \* \*